United States Patent
Je et al.

(10) Patent No.: US 10,711,387 B2
(45) Date of Patent: Jul. 14, 2020

(54) DRAIN PUMP DRIVING APPARATUS AND LAUNDRY TREATMENT MACHINE INCLUDING THE SAME

(71) Applicant: LG ELECTRONICS INC., Seoul (KR)

(72) Inventors: Jungmoon Je, Seoul (KR); Chungill Lee, Seoul (KR); Kiwook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/490,475

(22) Filed: Apr. 18, 2017

(65) Prior Publication Data

US 2017/0302208 A1    Oct. 19, 2017

(30) Foreign Application Priority Data

Apr. 18, 2016    (KR) .................. 10-2016-0047128

(51) Int. Cl.
*D06F 39/08*    (2006.01)
*D06F 33/02*    (2006.01)
(Continued)

(52) U.S. Cl.
CPC ............ *D06F 39/085* (2013.01); *D06F 33/02* (2013.01); *D06F 37/24* (2013.01); *D06F 37/304* (2013.01);
(Continued)

(58) Field of Classification Search
CPC ........ D06F 39/085; D06F 33/02; D06F 37/24; D06F 37/304; D06F 37/40; D06F 39/005; D06F 39/02; H02P 23/04
See application file for complete search history.

(56) References Cited

U.S. PATENT DOCUMENTS 6,240,586 B1    6/2001    Joo
2004/0070364 A1    4/2004    Cheong et al.
(Continued)

FOREIGN PATENT DOCUMENTS

CN    1268597    10/2000
CN    1217051    8/2005
(Continued)

OTHER PUBLICATIONS

Korean Office Action dated Jun. 30, 2017 issued in Patent Application 10-2016-0047128.
(Continued)

*Primary Examiner* — Joseph L. Perrin
(74) *Attorney, Agent, or Firm* — KED & Associates LLP

(57) ABSTRACT

Disclosed herein is a drain pump driving apparatus and a laundry treatment machine including the same. The drain pump driving apparatus and the laundry treatment machine including the same according to an embodiment of the present invention include a motor to operate the drain pump, an inverter to convert a direct current (DC) power to an alternating current (AC) power by a switching operation and output the converted AC power to the motor, an output current detector to detect an output current flowing to the motor, and a controller to control the inverter, wherein the controller may calculate a speed ripple of the motor based on the output current and performs a control operation based on the calculated speed ripple of the motor to change a speed of the motor.

18 Claims, 27 Drawing Sheets

(51) Int. Cl.
  *D06F 37/24* (2006.01)
  *D06F 37/30* (2006.01)
  *D06F 37/40* (2006.01)
  *D06F 39/00* (2006.01)
  *D06F 39/02* (2006.01)
  *H02P 23/04* (2006.01)
  *H02P 21/05* (2006.01)

(52) U.S. Cl.
  CPC ............ *D06F 37/40* (2013.01); *D06F 39/005* (2013.01); *D06F 39/02* (2013.01); *H02P 21/05* (2013.01); *H02P 23/04* (2013.01); *D06F 2204/065* (2013.01); *Y02B 40/52* (2013.01)

(56) References Cited

U.S. PATENT DOCUMENTS

| | | | |
|---|---|---|---|
| 2004/0139767 A1* | 7/2004 | Weinmann | H02P 25/14 68/12.16 |
| 2011/0247145 A1 | 10/2011 | Chanda et al. | |
| 2012/0005840 A1* | 1/2012 | Jang | D06F 33/02 8/137 |
| 2012/0006065 A1 | 1/2012 | Jung et al. | |
| 2012/0060527 A1 | 3/2012 | Song et al. | |
| 2014/0000664 A1 | 1/2014 | Badafem et al. | |

FOREIGN PATENT DOCUMENTS

| | | |
|---|---|---|
| CN | 101135096 | 3/2008 |
| CN | 102435041 | 5/2012 |
| CN | 202671900 | 1/2013 |
| CN | 103080406 | 5/2013 |
| CN | 203430799 | 2/2014 |
| CN | 104958055 | 10/2015 |
| CN | 105350267 | 2/2016 |
| DE | 102011000729 | 10/2011 |
| EP | 1 045 062 | 10/2000 |
| JP | 2001-342989 | 12/2001 |
| JP | 2004-232606 | 8/2004 |
| JP | 3803659 | 8/2006 |
| JP | 2008-000501 | 1/2008 |
| JP | 2009-215884 | 9/2009 |
| KR | 10-1996-0037945 | 11/1996 |
| KR | 20-0133050 | 10/1998 |
| KR | 10-0792676 | 1/2008 |
| KR | 10-0889817 | 3/2009 |
| KR | 10-2012-0012216 | 2/2012 |

OTHER PUBLICATIONS

European Search Report dated Jul. 11, 2017 issued in Patent Application 17166746.2.
Chinese Office Action dated Dec. 27, 2018 issued in Patent Application 201710253515.6.
Australian Office Action dated Feb. 18, 2019 issued in Patent Application 2017253449.

* cited by examiner

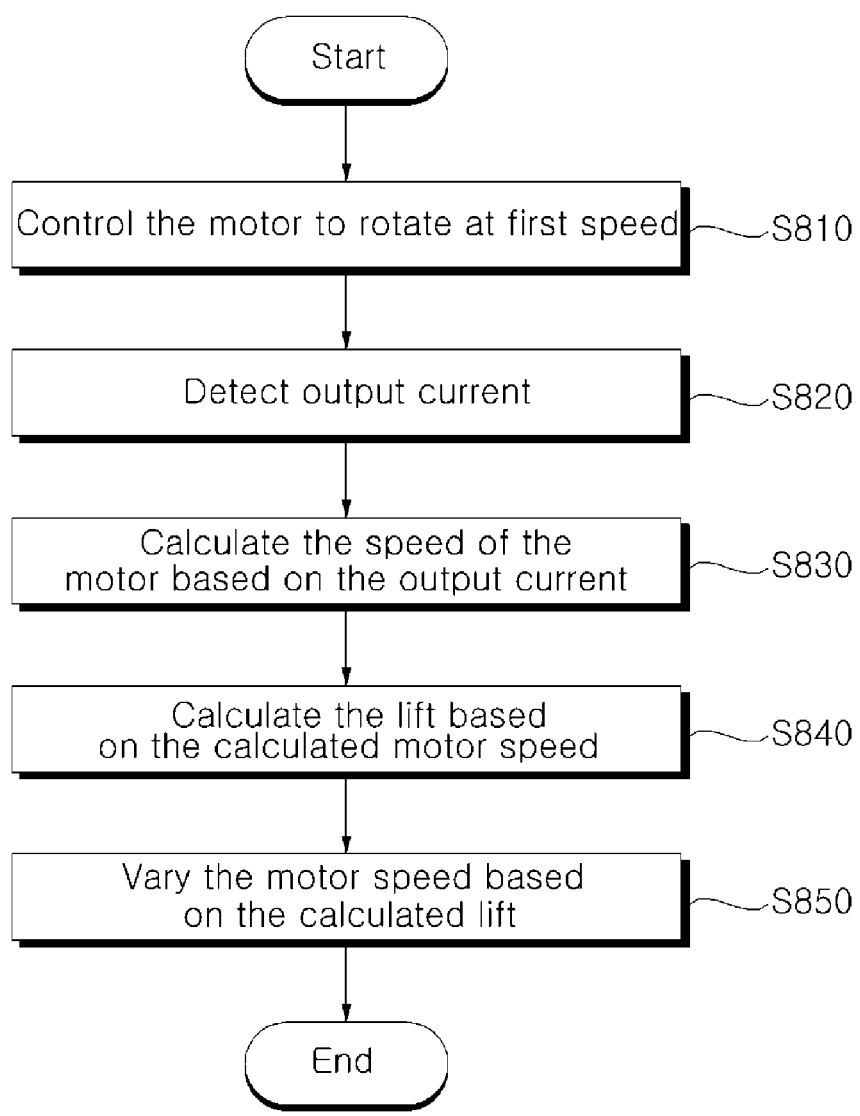

DRAIN PUMP DRIVING APPARATUS AND LAUNDRY TREATMENT MACHINE INCLUDING THE SAME

CROSS-REFERENCE TO RELATED APPLICATION

This application claims the priority benefit of Korean Patent Application No. 10-2016-0047128, filed on, 18 Apr. 2016 in the Korean Intellectual Property Office, the disclosure of which is incorporated herein by reference.

BACKGROUND

1. Field

The present invention relates to a drain pump driving apparatus and a laundry treatment machine including the same, and more particularly, to a drain pump driving apparatus capable of reducing noise during drainage and a laundry treatment machine including the same.

2. Background

Generally, a laundry treatment machine performs washing by using friction force between laundry and a washing tub that is rotated by a driving force of a motor transmitted thereto with a detergent, wash water and laundry put in a drum. The laundry treatment machine can produce a laundry washing effect with little damage to the laundry and no tangled laundry.

A drain pump is used to drain residual water from the washing tub in the laundry treatment machine, and various methods for stable operation of the drain pump are being discussed.

SUMMARY OF THE INVENTION

Therefore, the present invention has been made in view of the above problems, and it is an object of the present invention to provide a drain pump driving apparatus capable of reducing noise during drainage and a laundry treatment machine including the same.

In accordance with an aspect of the present invention, the above and other objects can be accomplished by the provision of a drain pump driving apparatus including a motor to operate the drain pump, an inverter to convert a direct current (DC) power to an alternating current (AC) power by a switching operation and output the converted AC power to the motor, an output current detector to detect an output current flowing to the motor, and a controller to control the inverter, wherein the controller may calculate a speed ripple of the motor based on the output current and performs a control operation based on the calculated speed ripple of the motor to change a speed of the motor.

In accordance with another aspect of the present invention, there is provided a laundry treatment machine including a washing tub, a driving unit to drive the washing tub, a drain pump, and a drain pump driving apparatus to drive the drain pump, wherein the drain pump driving apparatus includes a motor to operate the drain pump, an inverter to convert a direct current (DC) power to an alternating current (AC) power by a switching operation and output the converted AC power to the motor, an output current detector to detect an output current flowing to the motor, and a controller to control the inverter, wherein the controller may calculate a speed ripple of the motor based on the output current, and performs a control operation based on the calculated speed ripple of the motor to change a speed of the motor.

BRIEF DESCRIPTION OF THE DRAWINGS

The embodiments will be described in detail with reference to the following drawings in which like reference numerals refer to like elements wherein:

FIG. 11 is a flowchart showing another operation method of a drain pump driving apparatus according to an embodiment of the present invention;

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts.

As used herein, the suffixes "module" and "unit" are added or used interchangeably to facilitate preparation of this specification and are not intended to suggest distinct meanings or functions. Accordingly, the terms "module" and "unit" may be used interchangeably.

Figure 1:
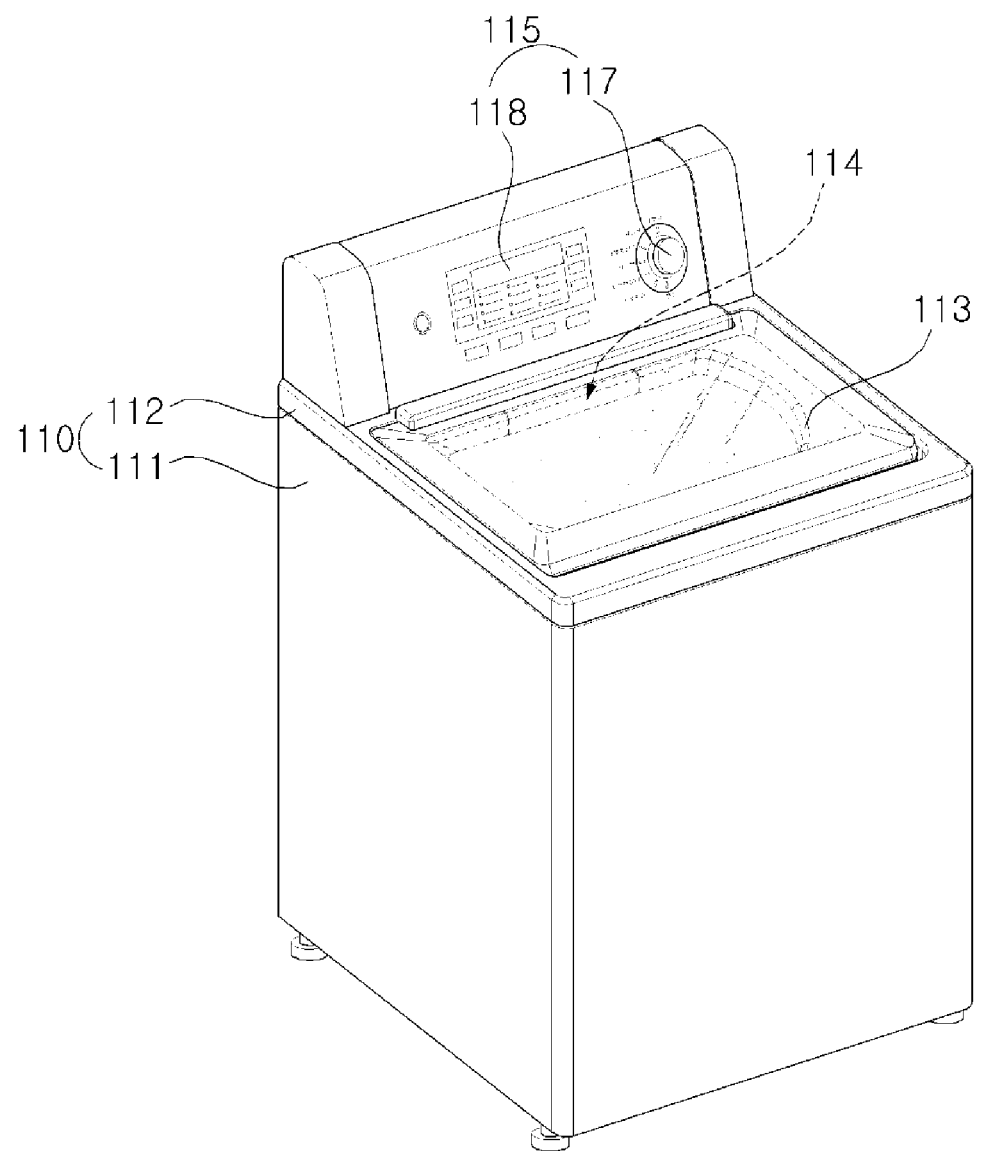
FIG. 1 is a perspective view illustrating a laundry treatment machine according to an embodiment of the present invention.
Figure 2:
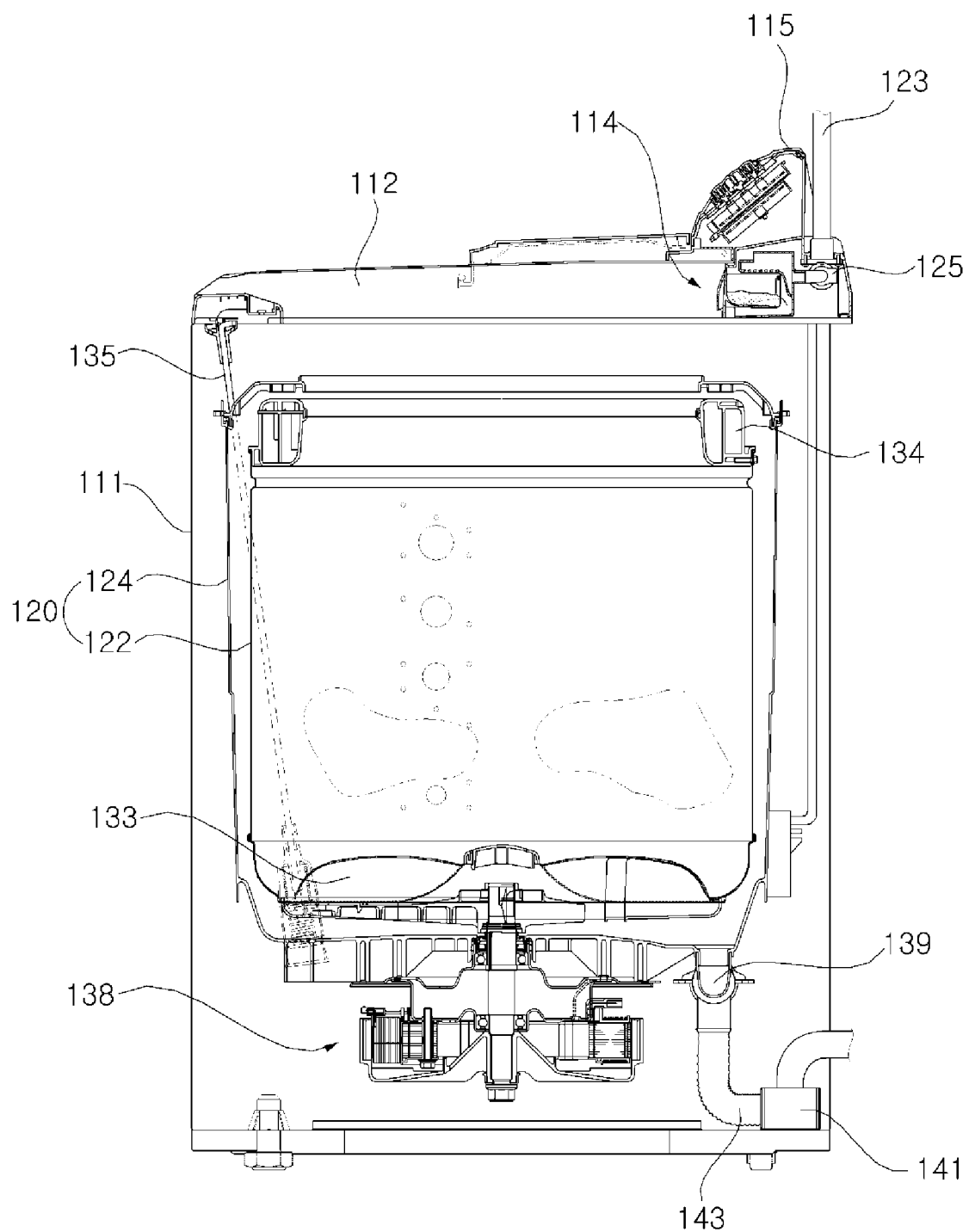
FIG. 2 is a side cross-sectional view illustrating the laundry treatment machine of FIG. 1.

FIG. 1 is a perspective view illustrating a laundry treatment machine according to an embodiment of the present invention, and FIG. 2 is a side cross-sectional view illustrating the laundry treatment machine of FIG. 1.

Referring to FIGS. 1 and 2, the laundry treatment machine 100 according to an embodiment of the present invention conceptually includes a washing machine having fabric inserted therein for performing washing, rinsing and dewatering, or a dryer having wet fabric inserted therein. The washing machine will be mainly described below.

The washing machine 100 includes a casing 110 forming an outer appearance, operation keys for receiving various control commands from a user, and a control panel 115 equipped with a display for displaying information on the operating state of the washing machine 100 to provide a user interface, and a door 113 rotatably installed in the casing 110 to open and close an entrance hole through which the laundry enters and exits.

The casing 110 includes a body 111 for defining a space in which various components of the washing machine 100 can be accommodated and a top cover 112 provided at an upper side of the body 111 and forming a fabric entrance hole to allow the laundry to be introduced into an inner tub 122 therethrough.

The casing 110 is described as including the body 111 and the top cover 112, but the casing 110 is not limited thereto as long as it forms the appearance of the washing machine 100.

A support rod 135 is coupled to the top cover 112 which is one of the constituent elements of the casing 110. However, the support rod 135 is not limited thereto and may be coupled to any part of the fixed portion of the casing 110.

The control panel 115 includes operation keys 117 for controlling an operation state of the laundry treatment machine 100 and a display 118 (not shown) disposed on one side of the operation keys 117 to display the operation state of the laundry treatment machine 100.

The door 113 opens and closes a fabric entrance hole (not shown) formed in the top cover 112 and may include a transparent member such as reinforced glass to allow the inside of the body 111 to be seen.

The washing machine 100 may include a washing tub 120. The washing tub 120 may include an outer tub 124 containing wash water and an inner tub 122 rotatably installed in the outer tub 124 to accommodate laundry. A balancer 134 may be provided at the upper portion of the washing tub 120 to compensate for unbalance amount generated when the washing tub 120 rotates.

Meanwhile, the washing machine 100 may include a pulsator 133 rotatably provided at a lower portion of the washing tub 120.

The driving apparatus 138 serves to provide a driving force for rotating the inner tub 122 and/or the pulsator 133. A clutch (not shown) for selectively transmitting the driving force of the driving apparatus 138 may be provided such that only the inner tub 122 is rotated, only the pulsator 133 is rotated, or the inner tub 122 and the pulsator 133 are rotated at the same time.

Figure 3:
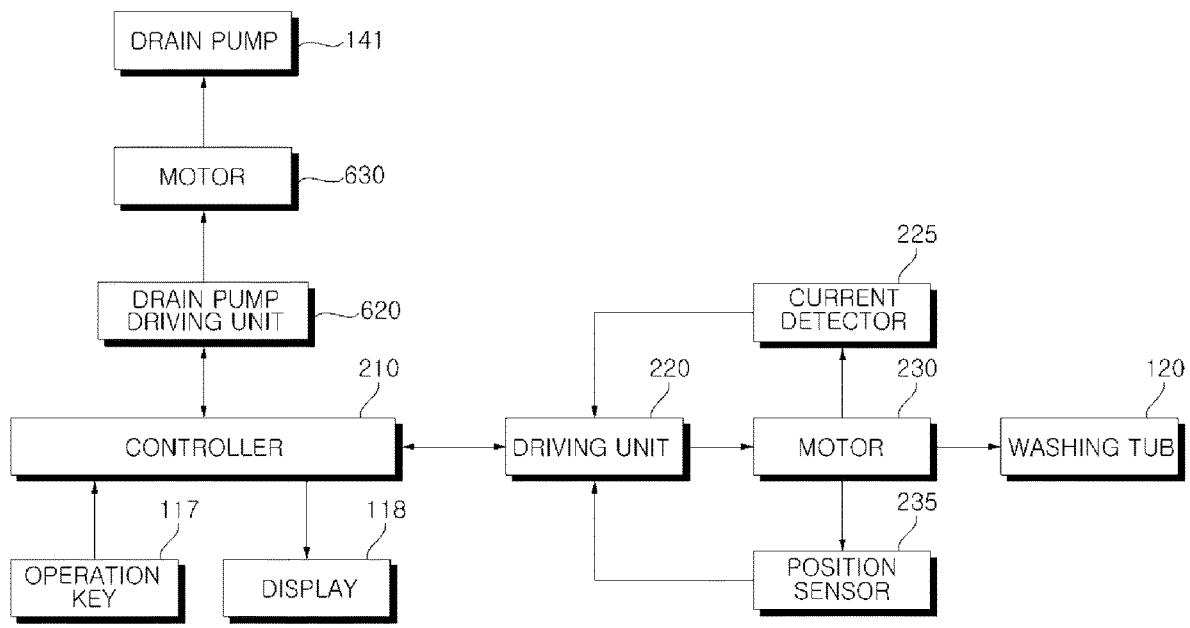
FIG. 3 is an internal block diagram of the laundry treatment machine of FIG. 1.

The driving apparatus 138 is operated by a driving unit 220 of FIG. 3, that is, a driving circuit. This will be described later with reference to FIG. 3 and other drawings.

A detergent box 114 for accommodating various additives such as a laundry detergent, a fabric softener, and/or a bleaching agent is retrievably provided to the top cover 112, and the wash water supplied through a water supply channel 123 flows into the inner tub 122 via the detergent box.

A plurality of holes (not shown) is formed in the inner tub 122. Thereby, the wash water supplied to the inner tub 122 flows to the outer tub 124 through the plurality of holes. A water supply valve 125 for regulating the water supply channel 123 may be provided.

The wash water is drained from the outer tub 124 through a drain channel 143. A drain valve 145 for regulating the drain channel 143 and a drain pump 141 for pumping the wash water may be provided.

The support rod 135 is provided to hang the outer tub 124 in the casing 110. One end of the support rod 135 is connected to the casing 110 and the other end of the support rod 135 is connected to the outer tub 124 by a suspension 150.

The suspension 150 attenuates vibration of the outer tub 124 during the operation of the washing machine 100. For example, the outer tub 124 may be vibrated by vibration generated as the inner tub 122 rotates. While the inner tub 122 rotates, the vibration caused by various factors such as unbalance laundry amount contained in the inner tub 122, the rotational speed of the inner tub 122 or the resonance characteristics of the inner tub 122 can be attenuated.

FIG. 3 is an internal block diagram of the laundry treatment machine of FIG. 1.

Referring to FIG. 3, in the laundry treatment machine 100, the driving unit 220 is controlled by the controller 210, and the driving unit 220 drives the motor 230. Thereby, the washing tub 120 is rotated by the motor 230.

The laundry treatment machine 100 may include a motor 630 for driving the drain pump 141 and a drain pump driving unit 620 for controlling the motor 630. The drain pump driving unit 620 can be controlled by the controller 210.

In this specification, the drain pump driving unit 620 may be referred to as a drain pump driving apparatus 620.

The controller 210 operates according to an operation signal received from an operation key 117. Thereby, washing, rinsing, and dewatering may be performed.

In addition, the controller 210 may control the display 118 to display a wash course, a wash time, a dewatering time, a rinsing time, or a current operation state.

Meanwhile, the controller 210 controls the driving unit 220 to operate the motor 230. For example, based on a current detector 225 for detecting the output current flowing through the motor 230 and a position sensor 235 for sensing the position of the motor 230, the controller 210 may control the driving unit 220 to rotate the motor 230. While the detected current and the sensed position signal are illustrated in FIG. 3 as being input to the driving unit 220, embodiments of the present invention are not limited thereto. The detected current and the sensed position signal may be applied to either the controller 210 or the controller 210 and the driving unit 220.

The driving unit 220, which serves to drive the motor 230, may include an inverter (not shown) and an inverter controller (not shown). Further, the driving unit 220 may further include a converter or the like for supplying DC power input to the inverter (not shown).

For example, when the inverter controller (not shown) outputs a switching control signal (Sic in FIG. 5) of a pulse width modulation (PWM) scheme to the inverter (not shown), the inverter (not shown) may supply AC power of a predetermined frequency to the motor 230 through high-speed switching.

The controller 210 may calculate the laundry amount based on the current detected by the current detector 225 or the position signal H sensed by the position sensor 235. For example, while the washing tub 120 rotates, the laundry amount may be calculated based on the current value io of the motor 230.

The controller 210 may calculate the unbalance amount of the washing tub 120, that is, the unbalance (UB) of the washing tub 120. Such unbalance amount calculation may be performed based on the ripple component of the current io detected by the current detector 225 or the amount of change in rotational speed of the washing tub 120.

Figure 4:
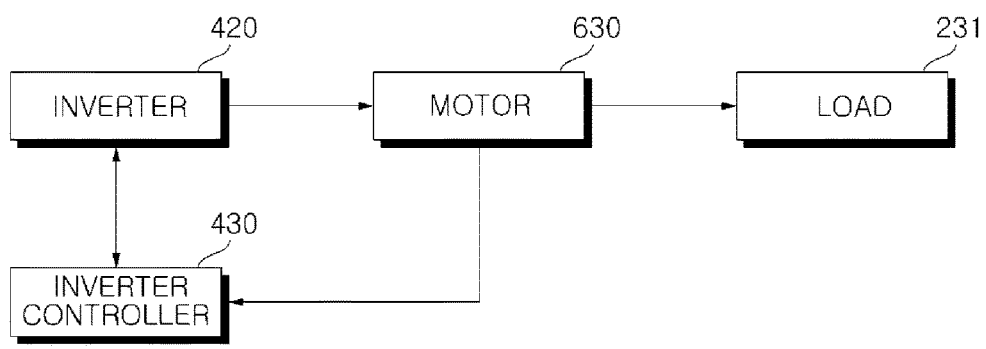
FIG. 4 is an exemplary internal block diagram of the drain pump driving apparatus of FIG. 1.
Figure 5:
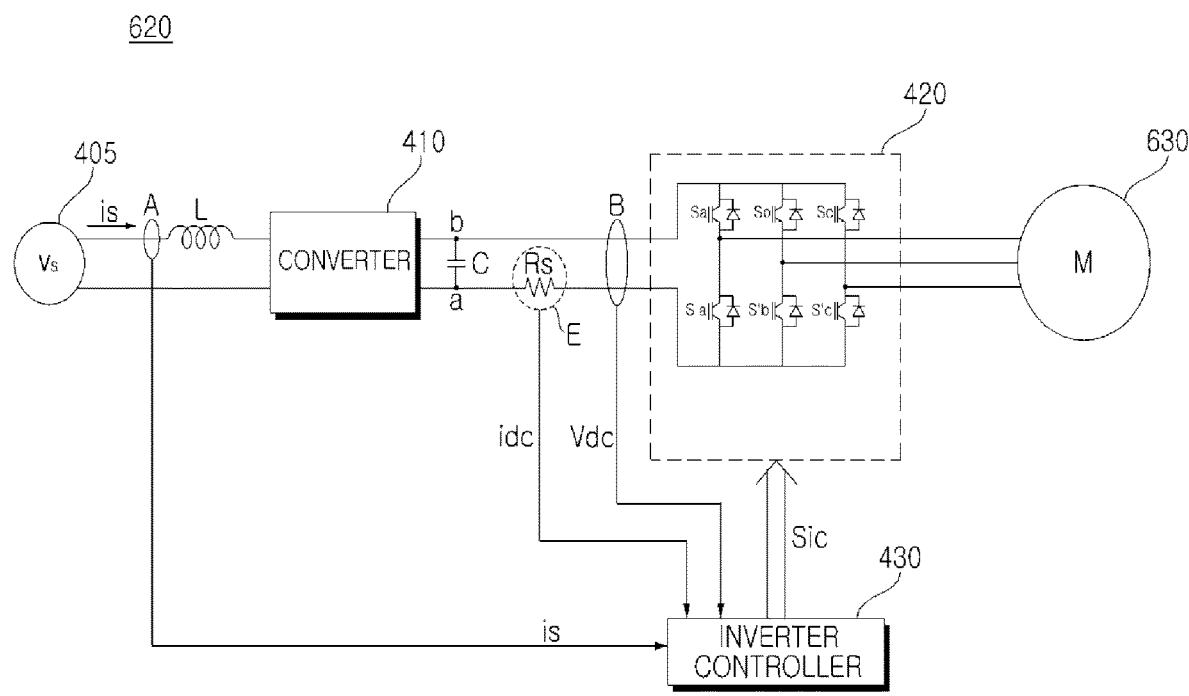
FIG. 5 is an exemplary internal circuit diagram of the drain pump driving apparatus of FIG. 4.

FIG. 4 is an exemplary internal block diagram of the drain pump driving apparatus of FIG. 1, and FIG. 5 is an exemplary internal circuit diagram of the drain pump driving apparatus of FIG. 4.

Referring to FIGS. 4 and 5, the drain pump driving apparatus 620 according to an embodiment serves to drive the motor 630 in a sensorless manner and includes an inverter 420 and an inverter controller 430.

According to an embodiment, the drain pump driving apparatus 620 may include a converter 410, a DC terminal voltage detector B, a smoothing capacitor C, and an output current detector E. The drain pump driving apparatus 620 may further include an input current detector A and a reactor L.

Hereinafter, the operation of each constituent unit in the drain pump driving apparatus 620 of FIGS. 4 and 5 will be described.

The reactor L is disposed between a commercial AC power source 405 and the converter 410, and performs a power factor correction operation or a boost operation. The reactor L may also function to limit the harmonic current resulting from high-speed switching of the converter 410.

The input current detector A may detect an input current is input from the commercial AC power source 405. To this end, a current transformer (CT), a shunt resistor, or the like may be used as the input current detector A. The detected input current is may be input to the inverter controller 430 as a discrete signal in the form of a pulse.

The converter 410 converts the commercial AC power 405 having passed through the reactor L into DC power and outputs the DC power. Although the commercial AC power source 405 is shown as a single-phase AC power source in FIG. 5, it may be a 3-phase AC power source. The internal structure of the converter 410 depends on the type of the commercial AC power source 405.

Meanwhile, the converter 410 may be configured with diodes or the like without a switching device, and may perform a rectification operation without a separate switching operation.

For example, in the case of a single-phase AC power source, four diodes may be used in the form of a bridge. In the case of a 3-phase AC power source, six diodes may be used in the form of a bridge.

As the converter 410, a half-bridge type converter having two switching devices and four diodes connected to each other may be used. In the case of a 3-phase AC power source, six switching devices and six diodes may be used for the converter.

When the converter 410 is provided with a switching device, the boost operation, the power factor correction, and the DC power conversion may be performed by the switching operation of the switching device.

The smoothing capacitor C smooths the input power and stores the same. In FIG. 5, one element is exemplified as the smoothing capacitor C, but a plurality of elements may be provided to secure element stability.

While the smoothing capacitor C is illustrated in FIG. 5 as being connected to the output terminal of the converter 410, embodiments of the present invention are not limited thereto. The DC power may be input directly to the smoothing capacitor C. For example, the DC power from a solar cell may be input directly to the smoothing capacitor C or may be DC-to-DC converted and input to the smoothing capacitor C. Hereinafter, the parts illustrated in the drawings will be mainly described.

Both ends of the smoothing capacitor C are referred to as DC terminals or DC links because the DC power is stored.

The DC terminal voltage detector B may detect the DC terminal voltage Vdc between both ends of the smoothing capacitor C. To this end, the DC terminal voltage detector B may include a resistance element and an amplifier. The detected DC terminal voltage Vdc may be input to the inverter controller 430 as a discrete signal in the form of a pulse.

The inverter 420 may include a plurality of inverter switching devices. The inverter 420 may convert the smoothed DC power Vdc into 3-phase AC powers va, vb and vc having predetermined frequencies by the on/off operation of the switching device, and output the same to a 3-phase synchronous motor 630.

The inverter 420 includes upper switching devices Sa, Sb and Sc and lower switching devices S'a, S'b and S'c. Each of the upper switching devices Sa, Sb, Sc and a corresponding lower switching device S'a, S'b, S'c are connected in series to form a pair. Three pairs of upper and lower switching devices Sa and S'a, Sb and S'b, and Sc and S'c are connected in parallel. Each of the switching devices Sa, S'a, Sb, S'b, Sc and S'c is connected with a diode in anti-parallel.

Each of the switching devices in the inverter 420 is turned on/off based on an inverter switching control signal Sic from the inverter controller 430. Thereby, 3-phase AC power having a predetermined frequency is output to the 3-phase synchronous motor 630.

The inverter controller 430 may control the switching operation of the inverter 420 in a sensorless manner. To this end, the inverter controller 430 may receive an output current idc detected by the output current detector E.

In order to control the switching operation of the inverter 420, the inverter controller 430 outputs the inverter switching control signal Sic to the inverter 420. The inverter switching control signal Sic is a pulse width modulated (PWM) switching control signal. The inverter switching control signal Sic is generated and output based on the output current idc detected by the output current detector E. The operation of outputting the inverter switching control signal Sic from the inverter controller 430 will be described in detail with reference to FIG. 6 later in this specification.

The output current detector E may detect the output current idc flowing between the inverter and the 3-phase motor 630.

The output current detector E may be disposed between the DC link capacitor C and the inverter 420 to detect an output current flowing to the motor.

In particular, the output current detector E may include one shunt resistance element Rs.

The output current detector E may use one shunt resistor element Rs to detect a phase current which is the output current idc flowing to the motor 630 in time division manner when the lower switching devices of the inverter 420 are turned on.

The detected output current idc, which is a discrete signal in the form of a pulse, may be applied to the inverter controller 430, and the inverter switching control signal Sic is generated based on the detected output current idc. Hereinafter, it is assumed that the detected output current idc includes 3-phase output currents ia, ib and ic.

The 3-phase motor 630 includes a stator and a rotor. The rotor rotates when the AC power of each phase of a predetermined frequency is applied to the coil of a corresponding phase (of phases a, b and c) of the stator.

Such motor 630 may include a brushless DC (BLDC) motor.

The motor 630 may include, for example, a Surface-Mounted Permanent-Magnet Synchronous Motor (SMPMSM), an Interior Permanent Magnet Synchronous Motor (IPMSM), and a Synchronous Reluctance Motor (SynRM). The SMPMSM and the IPMSM are Permanent Magnet Synchronous Motors (PMSM) employing permanent magnets, while the SynRM does not have a permanent magnet.

Figure 6:
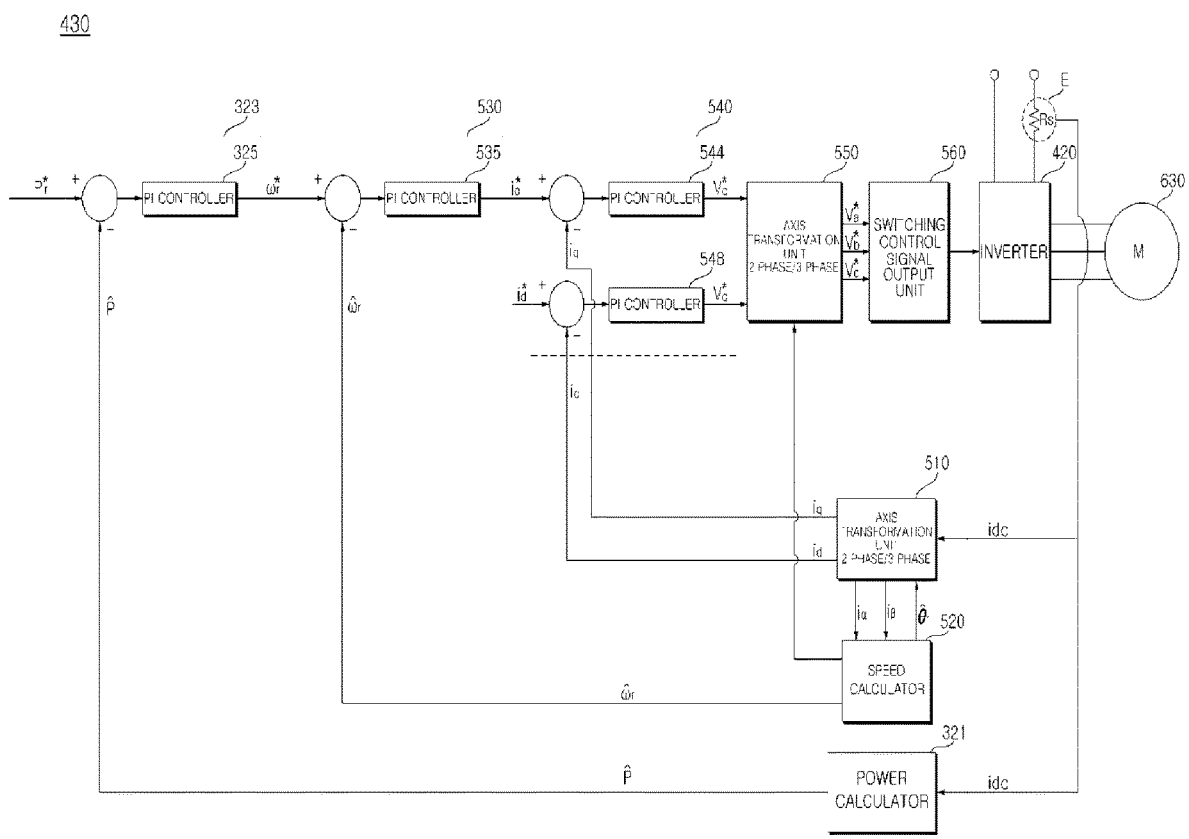
FIG. 6 is an internal block diagram of the inverter controller of FIG. 5.

FIG. 6 is an internal block diagram of the inverter controller of FIG. 5.

Referring to FIG. 6, the inverter controller 430 may include an axis transformation unit 510, a speed calculator 520, a power calculator 321, a speed command generator 323, a current command generator 530, a voltage command generator 540, an axis transformation unit 550, and a switching control signal output unit 560.

The axis transformation unit 510 may extract the respective phase currents ia, ib and ic from the output current idc detected by the output current detector E and transform the extracted phase currents ia, ib and ic, into 2-phase currents (iα, iβ) in the stationary coordinate system.

The axis transformation unit 510 may transform the 2-phase currents (iα, iβ) of the stationary coordinate system into 2-phase current (id, iq) of the rotating coordinate system.

The speed calculator 520 may estimate the position $\hat{\theta}_r$ based on the output current idc detected by the output current detector E and calculate the speed $\hat{\omega}_r$ by differentiating the estimated position.

The power calculator 321 may calculate the power or load of the motor 630 based on the output current idc detected by the output current detector E.

The speed command generator 323 generates a speed command value $\omega^*_r$ based on the power P calculated by the power calculator 321 and a power command value $P^*_r$. For example, the speed command generator 323 may perform PI control in the PI controller 325 based on the difference between the calculated power P and the power command value $P^*_r$, and generate a speed command value $\omega^*_r$.

The current command generator 530 generates a current command value $i^*_q$ based on the calculated speed $\hat{\omega}_r$ and a speed command value $\omega^*_r$. For example, the current command generator 530 may perform PI control in a PI controller 535 and generate the current command value $i^*_q$ based on the difference between the calculated speed $\hat{\omega}_r$ and the speed command value $\omega^*_r$. While FIG. 6 illustrates a q-axis current command value $i^*_q$ as a current command value, a d-axis current command value $i^*_d$ may also be generated. The d-axis current command value $i^*_d$ may be set to 0.

The current command generator 530 may further include a limiter (not shown) for limiting the level of the current command value $i^*_q$ such that the current command value $i^*_q$ does not exceed an allowable range.

Next, the voltage command generator 540 generates d-axis and q-axis voltage command values $v^*_d$ and $v^*_q$ based on the d-axis and q-axis currents $i_d$ and $i_q$ which are transformed into currents in the 2-phase rotating coordinate system by the axis transformation unit and the current command values $i^*_d$ and $i^*_q$ from the current command generator 530. For example, the voltage command generator 540 may perform PI control in a PI controller 544 and generate a q-axis voltage command value $v^*_d$ based on the difference between the q-axis current $i_q$ and the q-axis current command value $i^*_q$. In addition, the voltage command generator 540 may perform PI control in a PI controller 548 and generate the d-axis voltage command value $v^*_d$ based on the difference between the d-axis current $i_d$ and the d-axis current command value $i^*_d$. The voltage command generator 540 may further include a limiter (not shown) for limiting the levels of the d-axis and q-axis voltage command values $v^*_d$ and $v^*_q$ such that the d-axis and q-axis voltage command values $v^*_d$ and $v^*_q$ do not exceed an allowable range.

The generated d-axis and q-axis voltage command values $v^*_d$ and $v^*_q$ are input to the axis transformation unit 550.

The axis transformation unit 550 receives the position $\hat{\theta}_r$ calculated by the speed calculator 520 and the d-axis and q-axis voltage command values $v^*_d$ and $v^*_q$ and performs coordinate system transformation.

The axis transformation unit 550 transforms a 2-phase rotating coordinate system into a 2-phase stationary coordinate system. The transformation may be performed using the position $\hat{\theta}_r$ calculated by the speed calculator 520.

The axis transformation unit 550 may also transform the 2-phase stationary coordinate system into the 3-phase stationary coordinate system. Through such transformation, the axis transformation unit 550 outputs 3-phase output voltage command values v*a, v*b, and v*c.

The switching control signal output unit 560 outputs a PWM inverter switching control signal Sic based on the 3-phase output voltage command values v*a, v*b, and v*c.

The output inverter switching control signal Sic is transformed into a gate drive signal in a gate driving unit (not shown) and is then input to the gate of each switching device in the inverter 420. Thereby, the switching devices Sa, S'a, Sb, S'b, Sc, and S'c in the inverter 420 perform the switching operation.

Figure 7A:
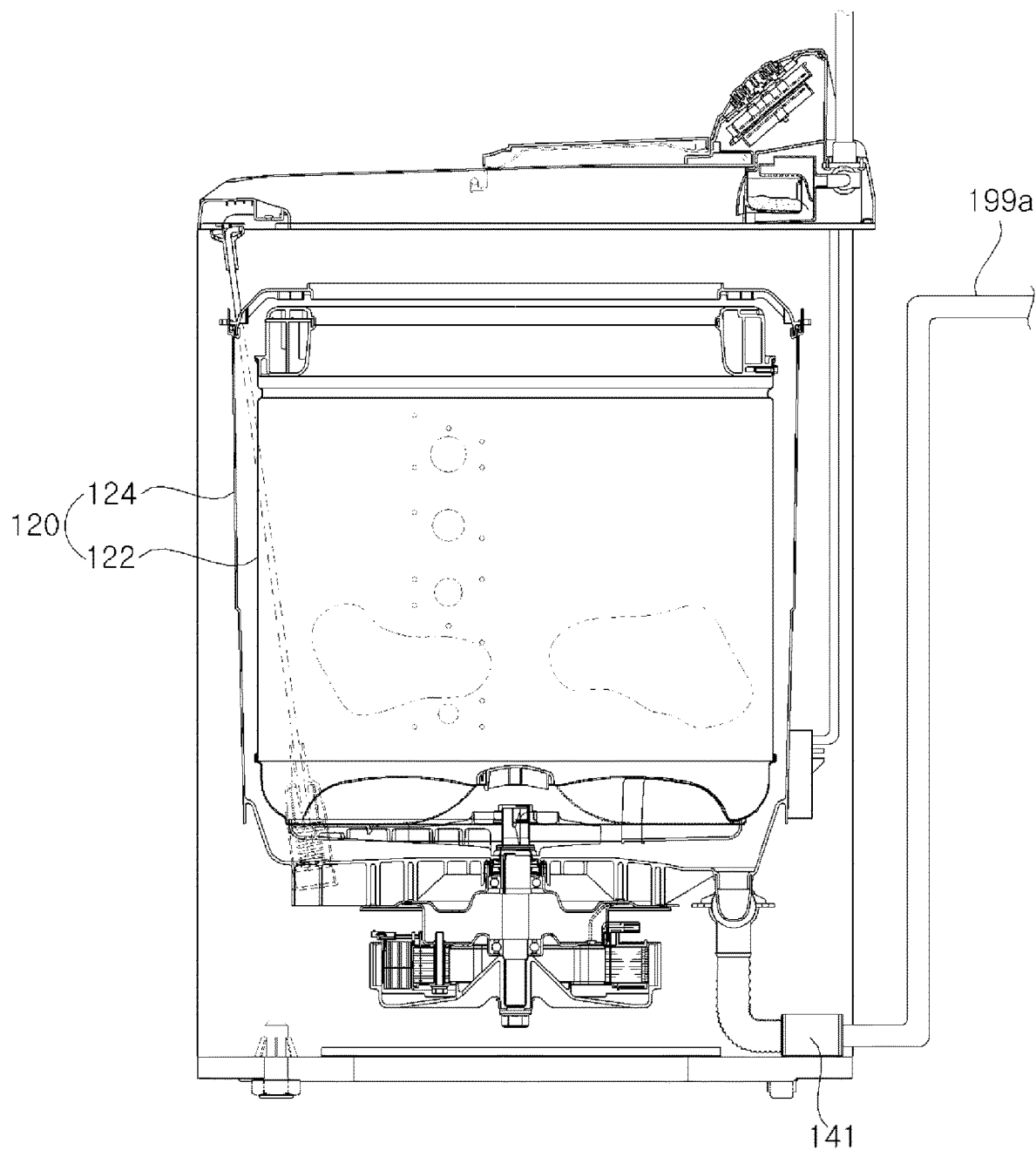
FIGS. 7A to 7B are views showing various examples of a drain pipe connected to the drain pump of the laundry treatment machine of FIG. 1.
Figure 7B:
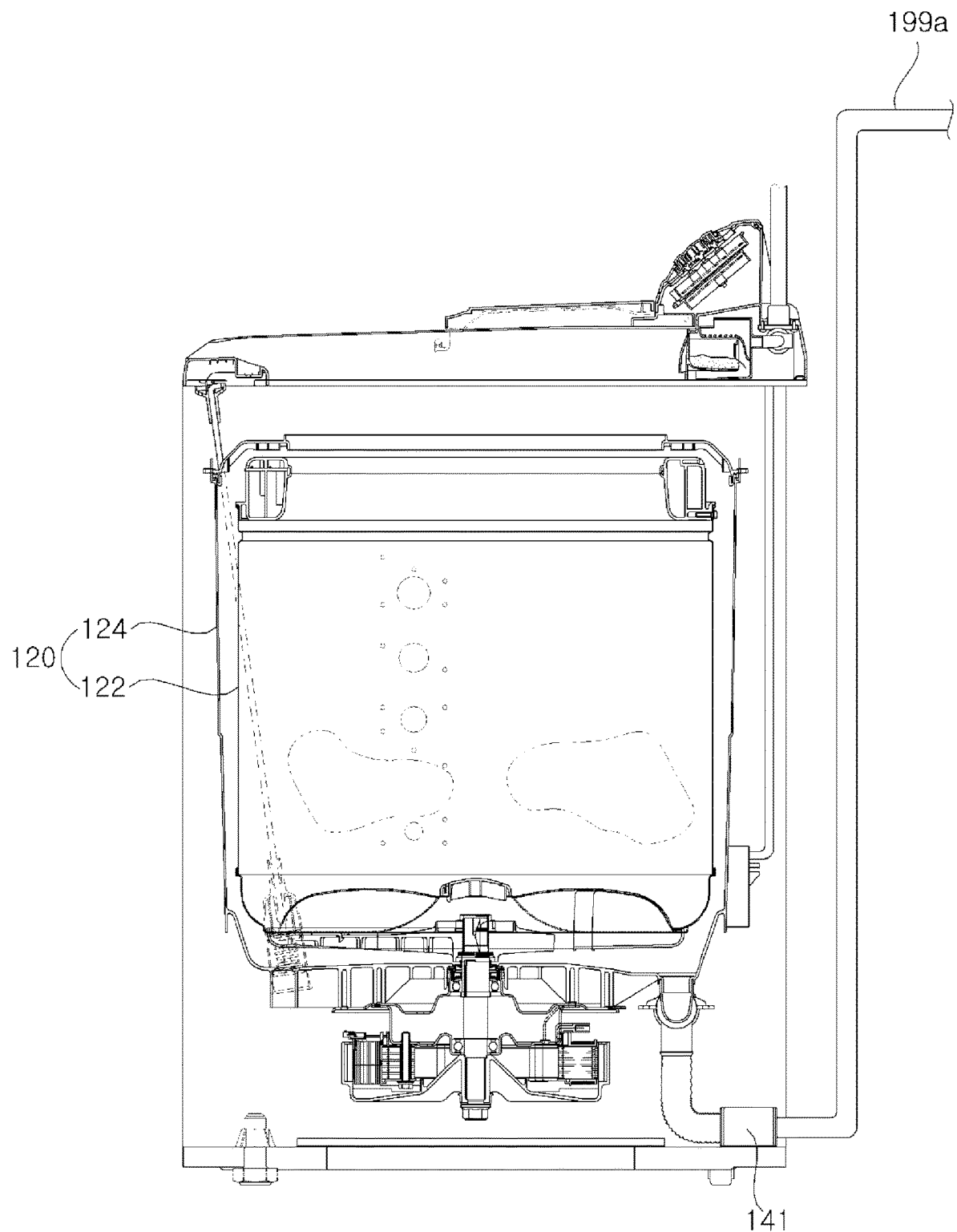

FIGS. 7A to 7B are views showing various examples of a drain pipe connected to the drain pump of the laundry treatment machine of FIG. 1.

FIG. 7A illustrates a case where the difference in height between the drain pump 141 and the drain pipe 199a is ha. FIG. 7B illustrates a case where the difference in height between the drain pump 141 and the drain pipe 199a is hb, which is greater than ha.

For example, ha may be approximately 0.9 m and hb may be approximately 2.4 m.

If the laundry treatment machine 100 is installed in a basement, the drain pipe 199a should extend to the ground for draining, and therefore, as shown in FIGS. 7A and 7B, it should extend to a position substantially higher than the drain pump 141.

In this case, if the drain pump is implemented using a solenoid, drainage will not be performed smoothly due to the low pumping power.

Accordingly, a motor is preferably used to drive the drain pump. Conventionally, an AC motor has been employed and driven at a constant speed of approximately 3000 rpm or 3600 rpm using an AC power of 50 Hz or 60 Hz.

In this case, since the motor is driven at a constant speed irrespective of the height of the drain pump, noise is generated by movement of the residual water remaining in the drain pipe 199a.

It is assumed in the present invention that a motor 630 capable of varying the speed is used in order to solve the problem above.

That is, according to an embodiment of the present invention, the motor 63 for driving the drain pump 141 may include a brushless DC (BLDC) motor 630. This will be described with reference to FIG. 8.

Further, in the present invention, a lift, which is a difference between the water level of a water introduction part through which water flows into the drain pump 141 and the water level of a water discharge part for discharging water from the drain pump 141 is calculated, and the rotational speed of the motor 630 is varied based on the calculated lift.

According to this configuration, the lift may be accurately calculated without using any water pressure sensor or water level sensor. Therefore, manufacturing costs may be reduced.

As the rotational speed of the motor 630 is controlled to be varied based on the calculated lift, drainage may be performed smoothly, and power consumption may be reduced. Details will be described with reference to FIG. 11 and subsequent figures.

Figure 8:
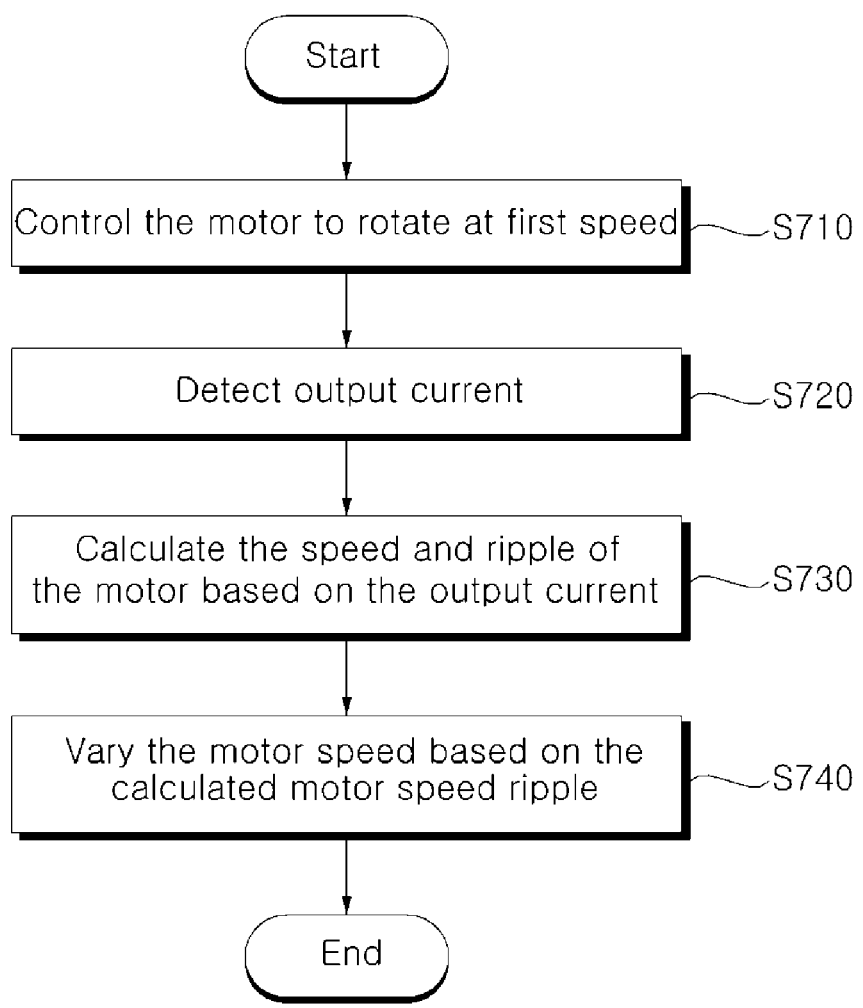
FIG. 8 is a flowchart showing an exemplary operation method for a drain pump driving apparatus according to an embodiment of the present invention.
Figure 9A:
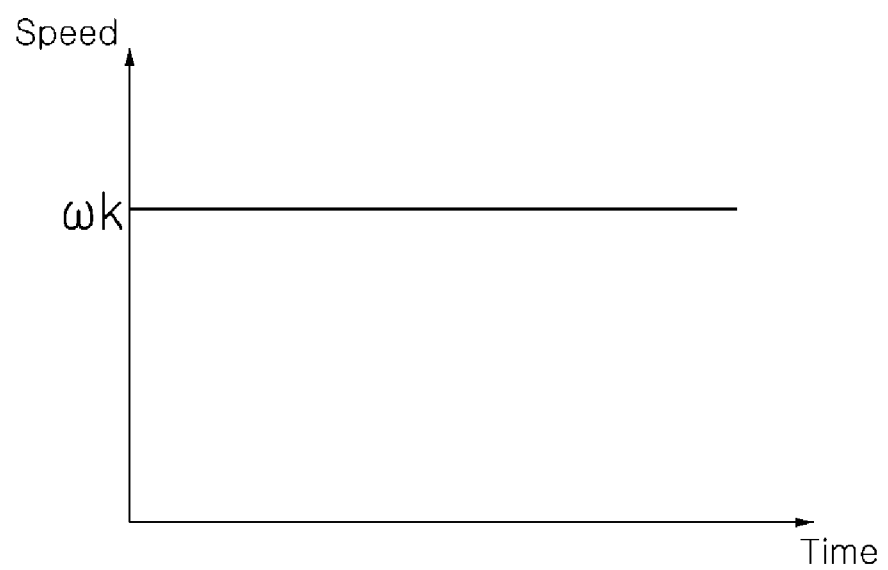
FIGS. 9A to 10 illustrate the operation method of FIG. 8.
Figure 9B:
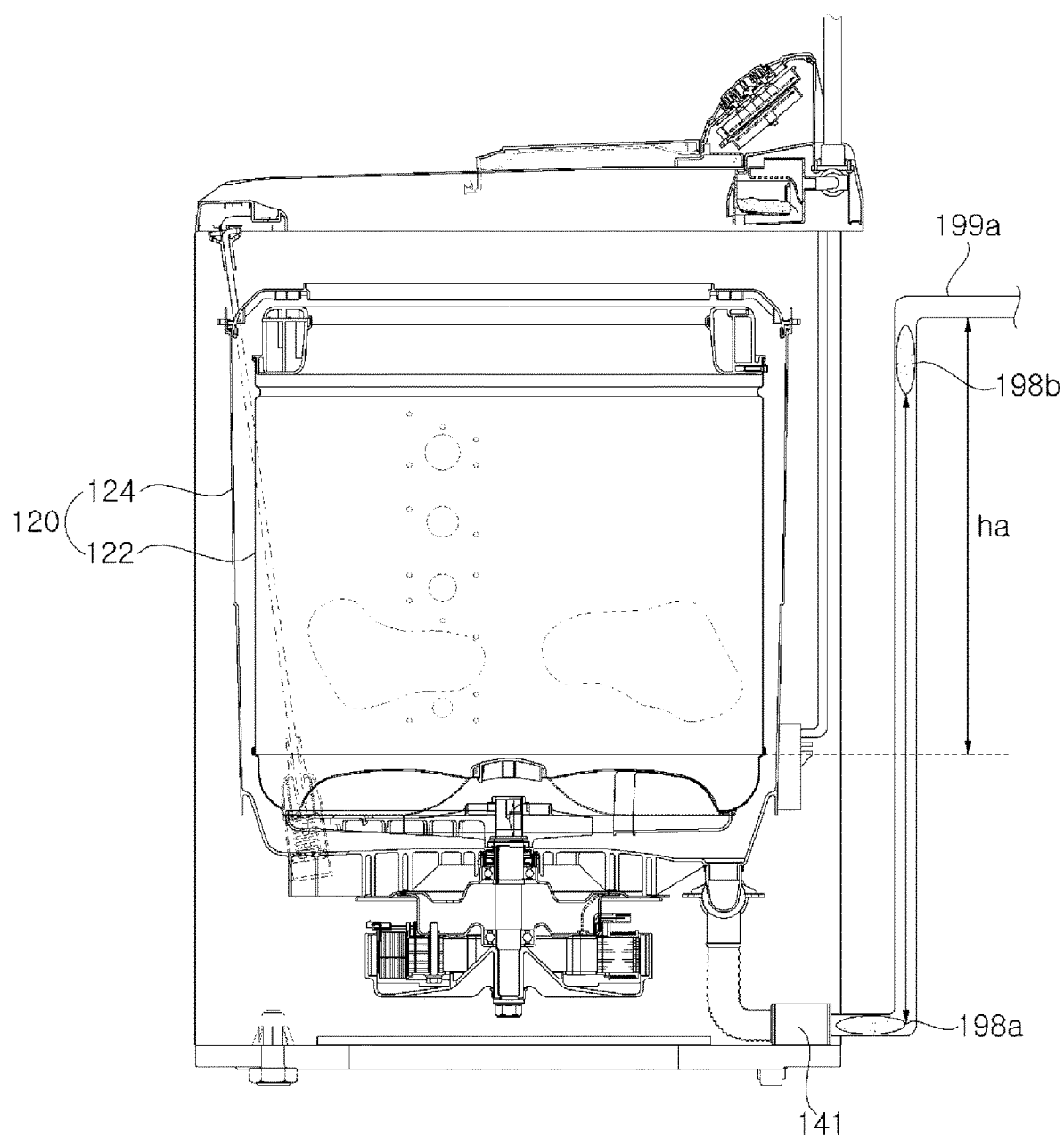
Figure 9C:
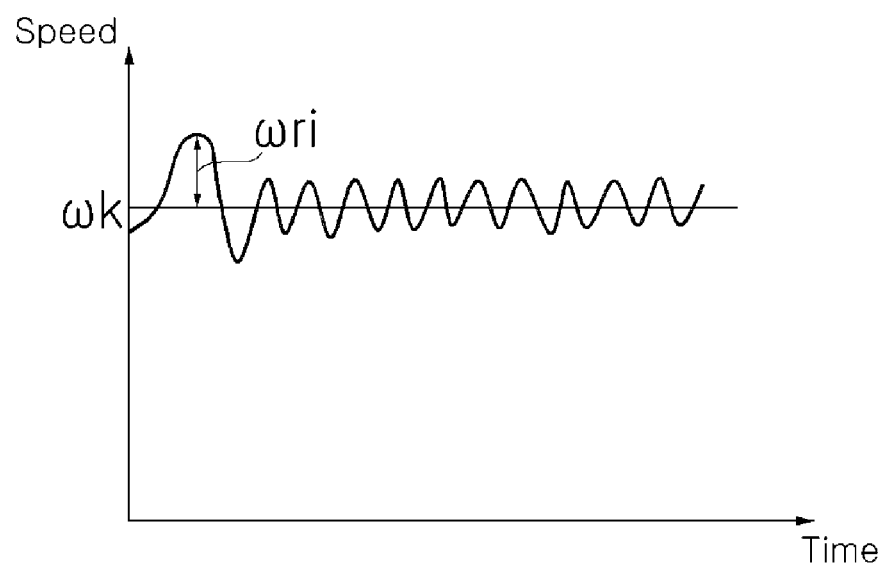
Figure 9D:
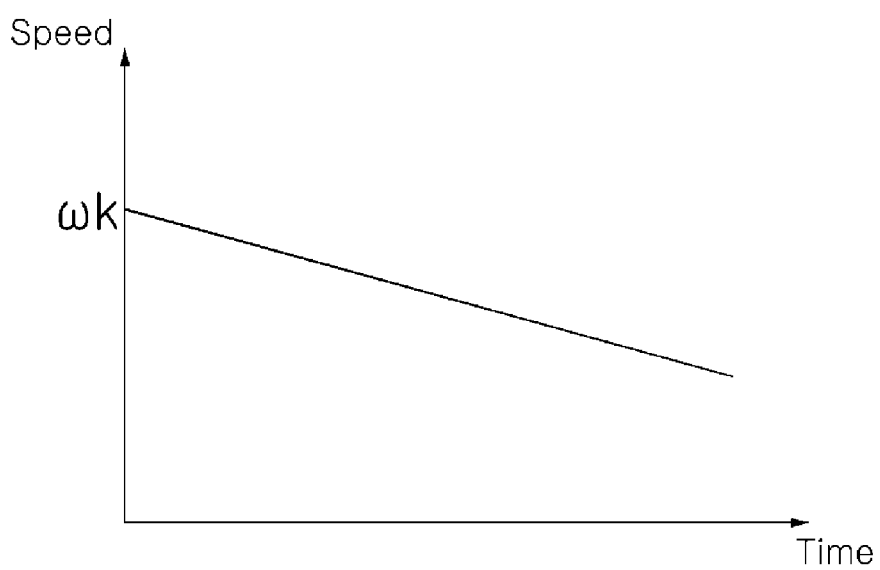
Figure 9E:
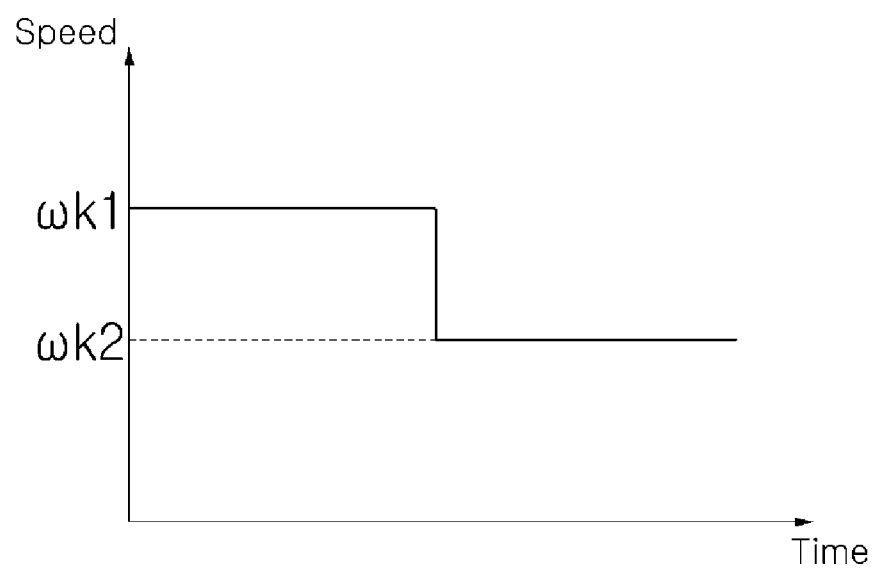
Figure 10:
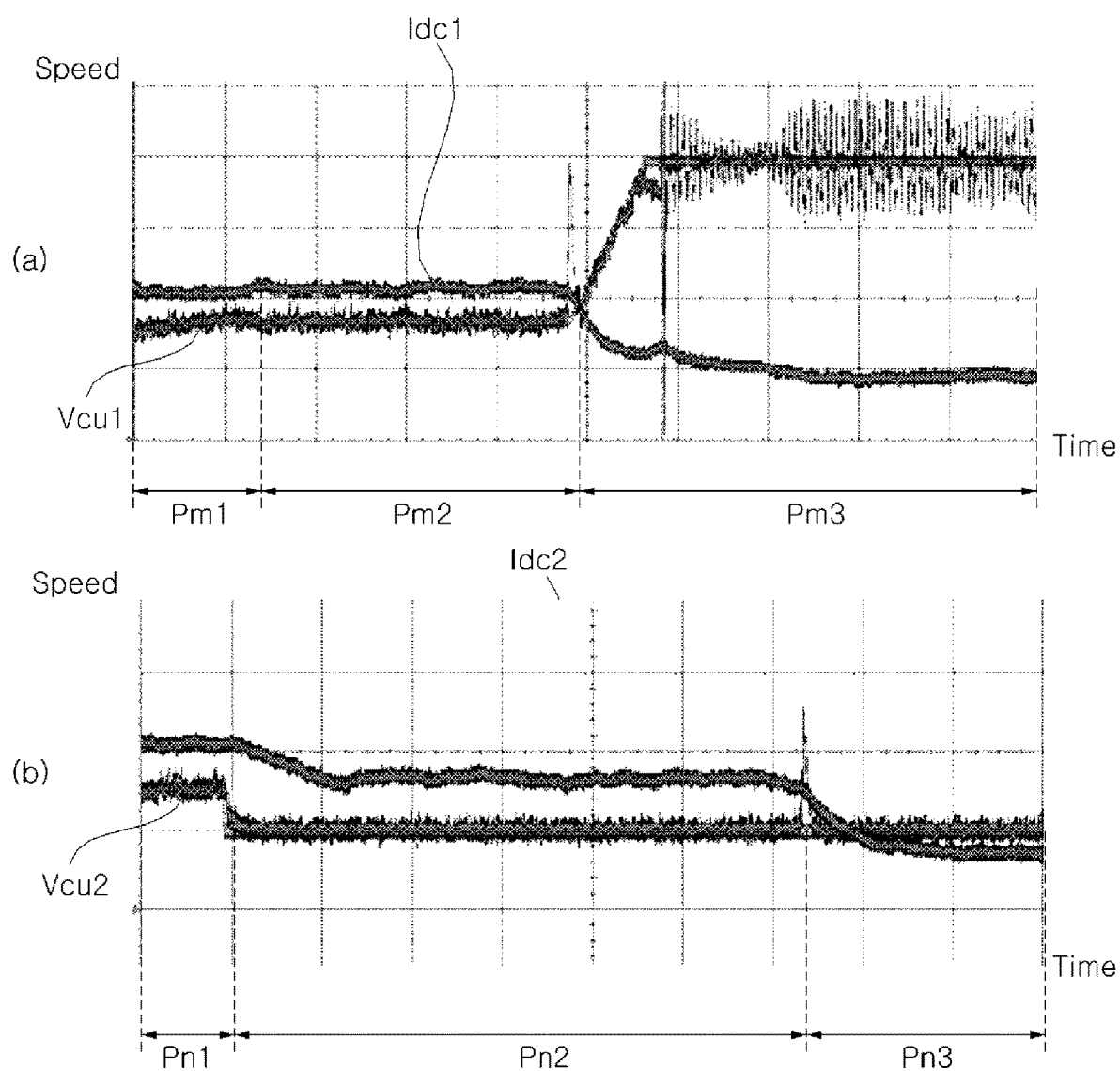

FIG. 8 is a flowchart showing an exemplary operation method for a drain pump driving apparatus according to an embodiment of the present invention, and FIGS. 9A to 10 illustrate the operation method of FIG. 8.

Referring to FIG. 8, the inverter controller 430 of the drain pump driving apparatus or the controller 210 of the laundry treatment machine controls the motor 630 to rotate at a first speed (S710).

Next, the output current detector E of the drain pump driving unit 620 detects the output current Idc flowing to the motor 630 (S720).

Next, the inverter controller 430 of the drain pump driving apparatus or the controller 210 of the laundry treatment machine calculates the speed and speed ripple of the motor 630 based on the detected output current Idc (S730).

The inverter controller 430 of the drain pump driving apparatus may calculate the motor speed based on the detected output current Idc as described with reference to FIG. 6.

The inverter controller 430 of the drain pump driving apparatus may calculate a ripple that indicates a change in the calculated speed.

Next, the inverter controller 430 of the drain pump driving apparatus or the controller 210 of the laundry treatment machine performs a control operation based on the calculated motor speed ripple to change the motor speed (S740).

The inverter controller 430 of the drain pump driving apparatus or the controller 210 of the laundry processing device may control the speed of the motor to be decreased sequentially or stepwise as the calculated motor speed ripple increases.

Accordingly, the noise generated by the residual water may be reduced when the laundry treatment machine 100 is drained.

Particularly, when the laundry treatment machine 100 performs the dewatering process without the washing process and the rinsing process, the inverter controller 430 of the drain pump driving apparatus or the controller 210 of the laundry treatment machine may calculate the speed ripple of the motor based on the output current Idc, and perform a control operation based on the calculated motor speed ripple to change the speed of the motor. Thereby, noise caused by residual water remaining in the drain pipe and the BLDC may be reduced.

FIG. 9A illustrates rotating the motor 630 at a speed of $\omega k$.

When the motor rotates at the speed of $\omega k$, the inverter controller 430 of the drain pump driving apparatus or the controller 210 of the laundry treatment machine may calculate the speed and speed ripple on the basis of the output current Idc detected by the output current detector E.

For example, a speed ripple corresponding to the speed ripple waveform shown in FIG. 9C may be calculated.

This speed ripple may be caused by residual water 198a and 198b moving in the drain pipe 199a as shown in FIG. 9B.

For example, when the motor 630 of the drain pump 141 is operated at the speed of $\omega w k$, the residual water 198a and 198b may reciprocate between the drain pump 141 and the drain pipe 199a.

Particularly, when the water moves toward the drain pump 141, the movement affects the motor 630 rotating at the speed of $\omega k$, and thus ripples are generated in the motor 630. Thereby, noise is generated.

The inverter controller 430 of the drain pump driving apparatus or the controller 210 of the laundry treatment machine may perform a control operation based on the speed ripple $\omega r i$ of FIG. 9C to change the speed of the motor so as to reduce noise.

The inverter controller 430 of the drain pump driving apparatus or the controller 210 of the laundry treatment machine may control the speed of the motor to sequentially decrease as shown in FIG. 9D as the calculated motor speed ripple increases.

The inverter controller 430 of the drain pump driving apparatus or the controller 210 of the laundry treatment machine may control the speed of the motor to decrease stepwise as shown in FIG. 9E as the calculated motor speed ripple increases.

FIG. 10(a) illustrates an output current waveform Idc1 and a motor speed waveform Vcd1 obtained when the driving method of FIG. 8 is not used, and FIG. 10(b) illustrates an output current waveform Idc2 and a motor speed waveform Vcd2 obtained when the driving method of FIG. 8 is used.

Referring to FIG. 10, it can be seen that, when the driving method of FIG. 8 is not used, a significant ripple component occurs in the motor speed waveform Vcd1 during the period Pm3. As a result, significant noise is generated.

On the other hand, when the driving method of FIG. 8 is used, the ripple component is significantly reduced in the motor speed waveform Vcd2 during all periods including the period Pm3. Thereby, noise may be significantly reduced, and the motor 630 of the drain pump 141 may be stably driven.

FIG. 11 is a flowchart showing another operation method of a drain pump driving apparatus according to an embodiment of the present invention, and FIGS. 12A to 14B illustrate the operation method of FIG. 11.

Referring to FIG. 11, the inverter controller 430 of the drain pump driving apparatus or the controller 210 of the laundry treatment machine controls the motor 630 to rotate at a first speed (S810).

Next, the output current detector E of the drain pump driving unit 620 detects the output current Idc flowing through the motor 630 (S820).

Next, the inverter controller 430 of the drain pump driving apparatus or the controller 210 of the laundry treatment machine calculates the speed of the motor 630 based on the detected output current Idc (S830).

The inverter controller 430 of the drain pump driving apparatus may calculate the motor speed based on the detected output current Idc as described with reference to FIG. 6.

Next, the inverter controller 430 of the drain pump driving apparatus or the controller 210 of the laundry treatment machine calculates a lift based on the calculated motor speed (S840).

The inverter controller 430 of the drain pump driving apparatus or the controller 210 of the laundry treatment machine may calculate the lift, which is a difference between the water level of a water introduction part through which water flows into the drain pump 141 and the water level of a water discharge part for discharging water from the drain pump 141.

For example, the inverter controller 430 of the drain pump driving apparatus or the controller 210 of the laundry treatment machine may calculate the difference between the bottom surface of the washing tub 120 and the final height of the drain pipe 199*a* as the lift.

As another example, the inverter controller 430 of the drain pump driving apparatus or the controller 210 of the laundry treatment machine may calculate the difference between the position of the drain pump 141, which is lower than the bottom surface of the washing tub 120, and the final position of the drain pipe 199*a* as the lift.

The inverter controller 430 of the drain pump driving apparatus or the controller 210 of the laundry treatment machine may control the motor 630 to rotate at a first speed. When rotation at the first speed is controlled, if the speed of the motor 630 calculated based on the output current Idc is a second speed, the lift may be calculated as a first level based on the second speed.

The inverter controller 430 of the drain pump driving apparatus or the controller 210 of the laundry treatment machine may control the motor 630 to rotate at a first speed. When rotation at the first speed is controlled, if the speed of the motor 630 calculated based on the output current Idc is a third speed lower than the second speed, the lift may be calculated as a second level higher than the first level.

The inverter controller 430 of the drain pump driving apparatus or the controller 210 of the laundry treatment machine may calculate a lower level of the lift as the calculated speed of the motor 630 is lowered.

Next, the inverter controller 430 of the drain pump driving apparatus or the controller 210 of the laundry treatment machine varies the motor speed based on the calculated lift (S850).

The inverter controller 430 of the drain pump driving apparatus or the controller 210 of the laundry treatment machine may control the rotational speed of the motor 630 to be varied based on the calculated lift such that the speed of the motor 630 decreases as the water level of the water introduction part is lowered.

Figure 12A:
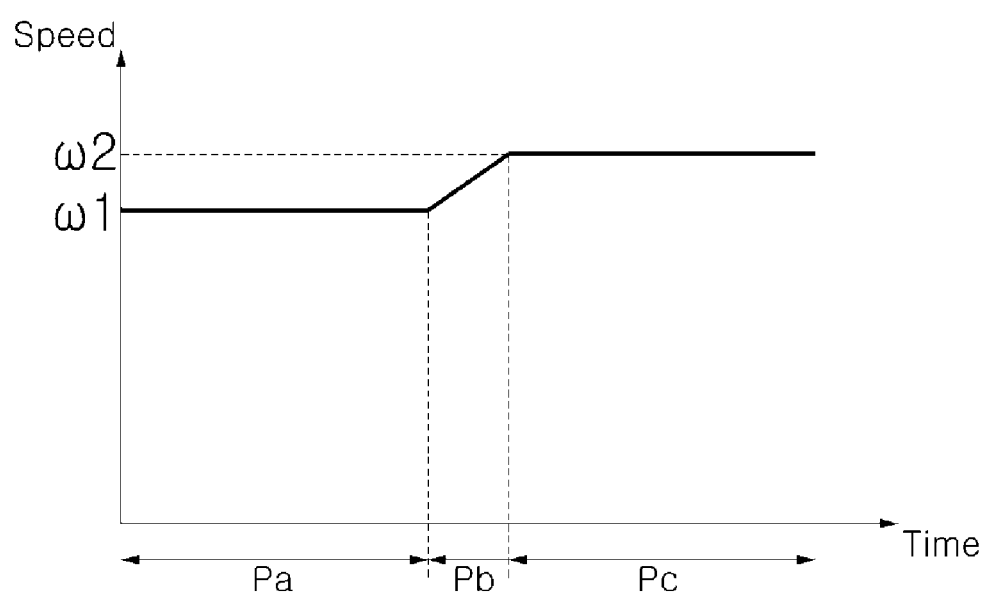
FIGS. 12A to 14B illustrate the operation method of FIG. 11.

FIG. 12A depicts a case where the motor 630 rotates at a speed of $\omega 1$ during the period Pa, and gradually slows down during the period Pb, which is a transition period, and then rotates at a speed of $\omega 2$ lower than $\omega 1$ during the period Pc.

The inverter controller 430 of the drain pump driving apparatus or the controller 210 of the laundry treatment machine controls the motor 630 to rotate at the actual speed command value $\omega 1$. If the speed of the motor 630 calculated based on the output current is $\omega 2$, the lift may be calculated based on the difference between $\omega 1$ and $\omega 2$.

Figure 12B:
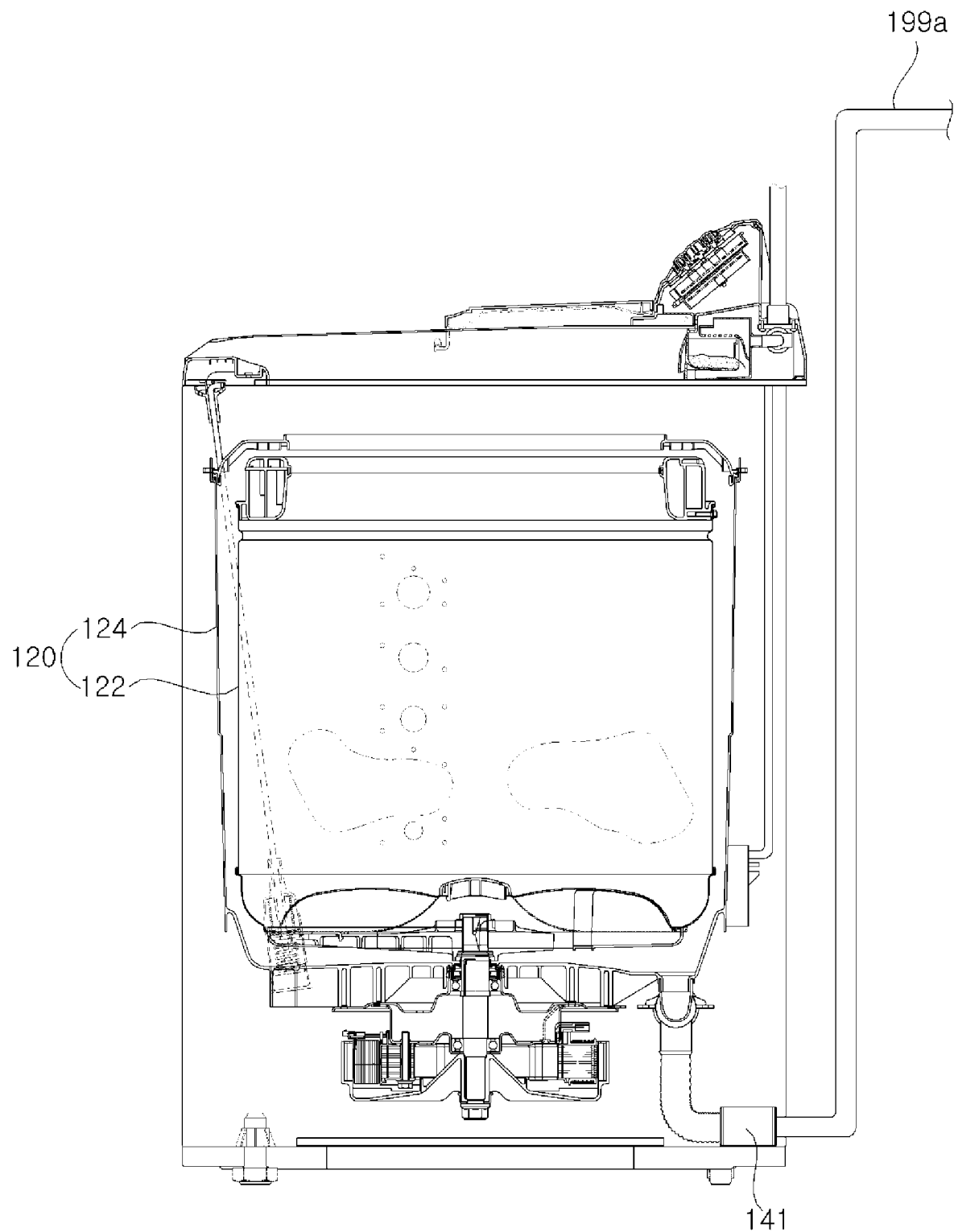
Figure 12C:
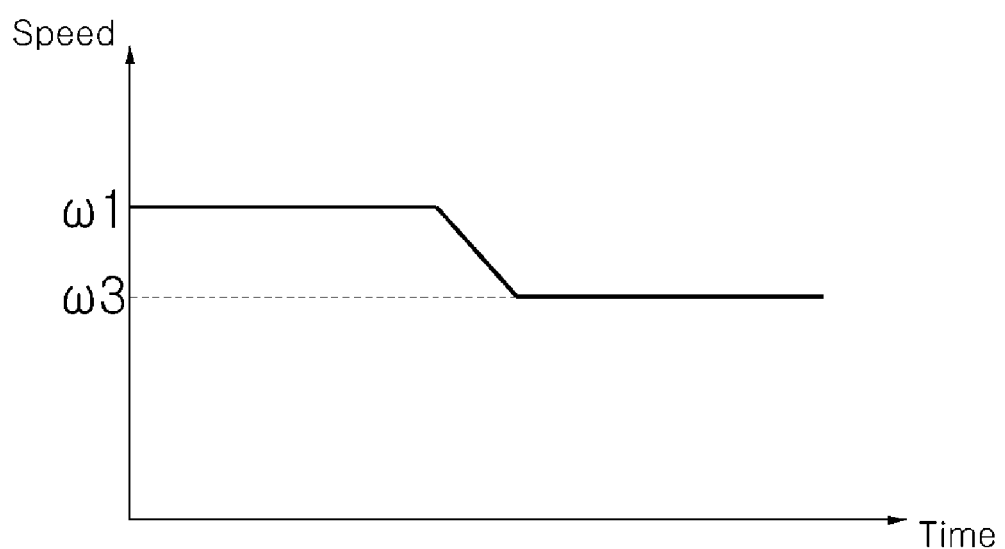

For example, as shown in FIG. 12B, the lift, which is the difference between the position of the drain pump 141 and the final height of the drain pipe 199*a*, may be calculated as hb.

The data on the lift for the speed difference may be a value preset by an experiment, and may be pre-stored in a lookup table or memory.

FIG. 12A depicts a case where the motor 630 rotates at a speed of $\omega 1$ during the period Pa, and gradually slows down during the period Pb, which is a transition period, and then rotates at a speed of $\omega 3$ lower than $\omega 1$ during the period Pc.

The inverter controller 430 of the drain pump driving apparatus or the controller 210 of the laundry treatment machine controls the motor 630 to rotate at the actual speed command value $\omega 1$. If the speed of the motor 630 calculated based on the output current is $\omega 3$, the lift may be calculated based on the difference between $\omega 1$ and $\omega 3$.

Here, $\omega 3$ may be less than $\omega 2$.

Figure 12D:
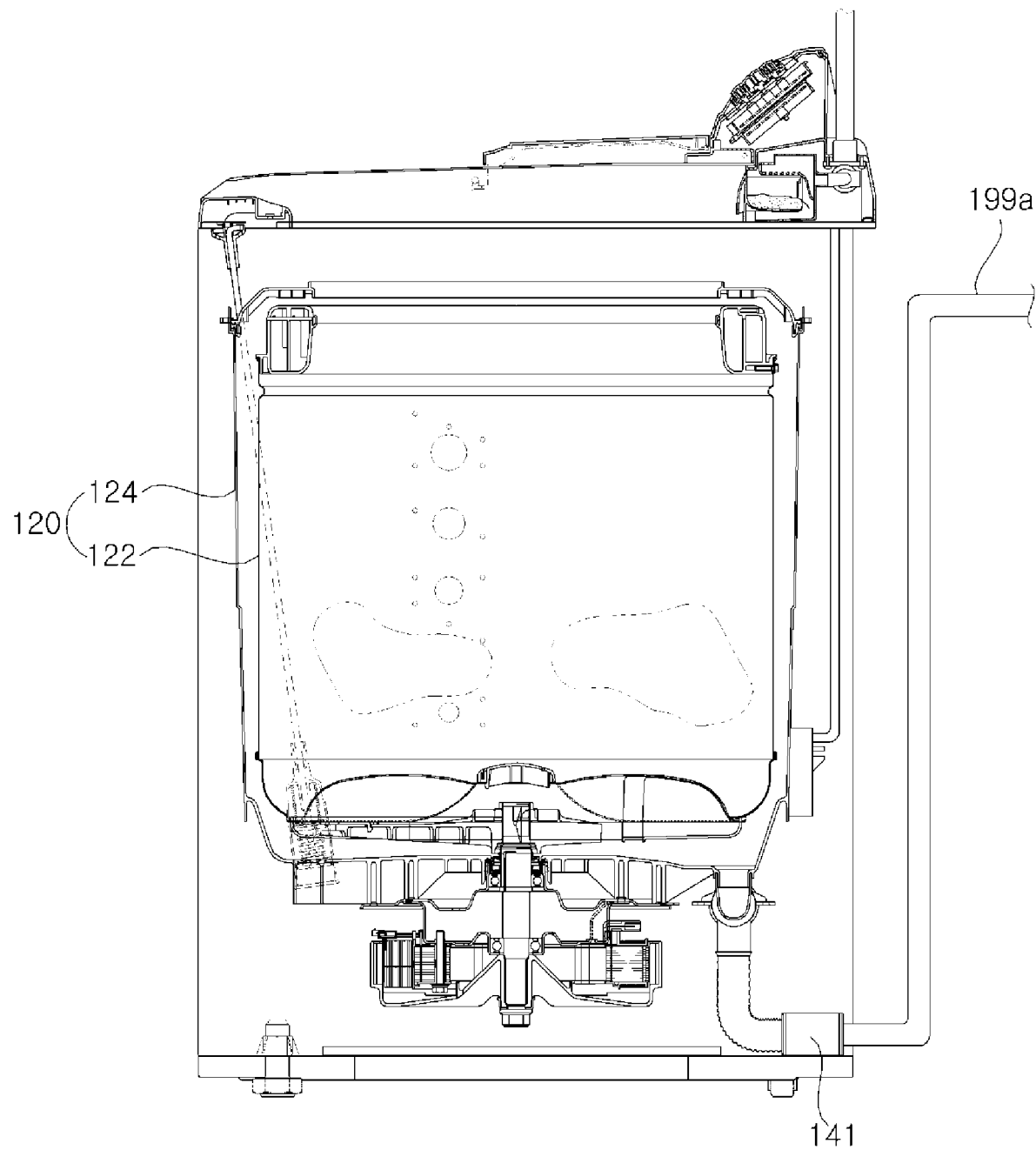

Accordingly, as shown in FIG. 12D, the lift, which is the difference between the position of the drain pump 141 and the final height of the drain pipe 199*a*, may be calculated as ha.

That is, the inverter controller 430 of the drain pump driving apparatus or the controller 210 of the laundry treatment machine may calculate a lower level of the lift as the calculated speed of the motor 630 is lowered.

Since the level of the lift can be calculated on the basis of the speed of the motor 630 calculated based on the output current as described above, the lift may be accurately calculated without using any separate water pressure sensor or water level sensor.

Figure 13A:
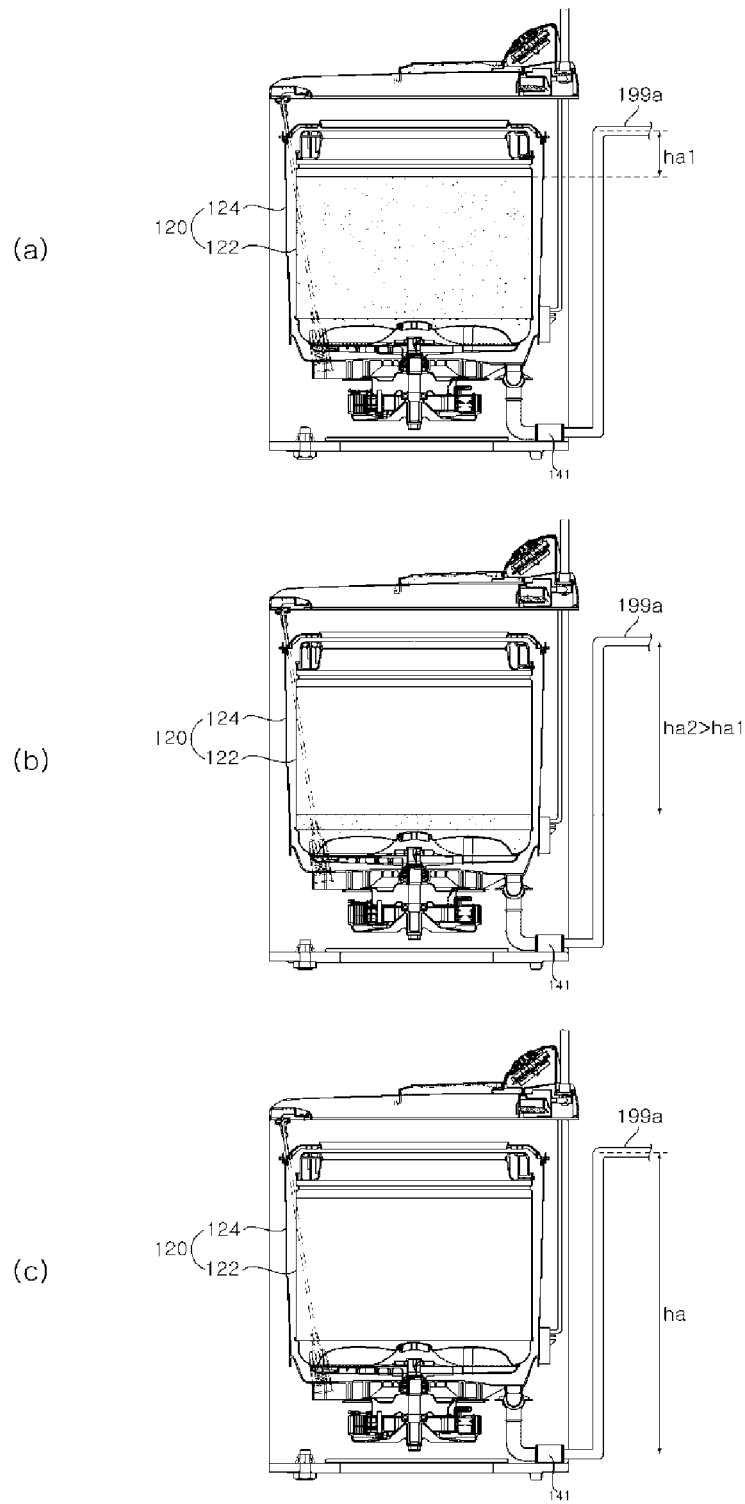

FIG. 13A illustrates that the water level in the washing tub 120 is sequentially lowered.

In particular, FIG. 13A corresponds to FIG. 7B in terms of the position of the drain pipe 199*a*.

FIG. 13A(a) illustrates a case where the difference between the water level of the washing tub and the height of the drain pipe 199*a* is hb1, FIG. 13A(b) illustrates a case where the difference between the water level of the washing tub and the height of the drain pipe 199*a* is hb2, and FIG. 13A(c) illustrates a case where the water level of the washing tub is zero.

The inverter controller 430 of the drain pump driving apparatus or the controller 210 of the laundry treatment machine may control the rotational speed of the motor 630 to be varied based on the calculated lift such that the speed of the motor 630 decreases as the water level of the water introduction part is lowered, as described above.

Figure 13B:
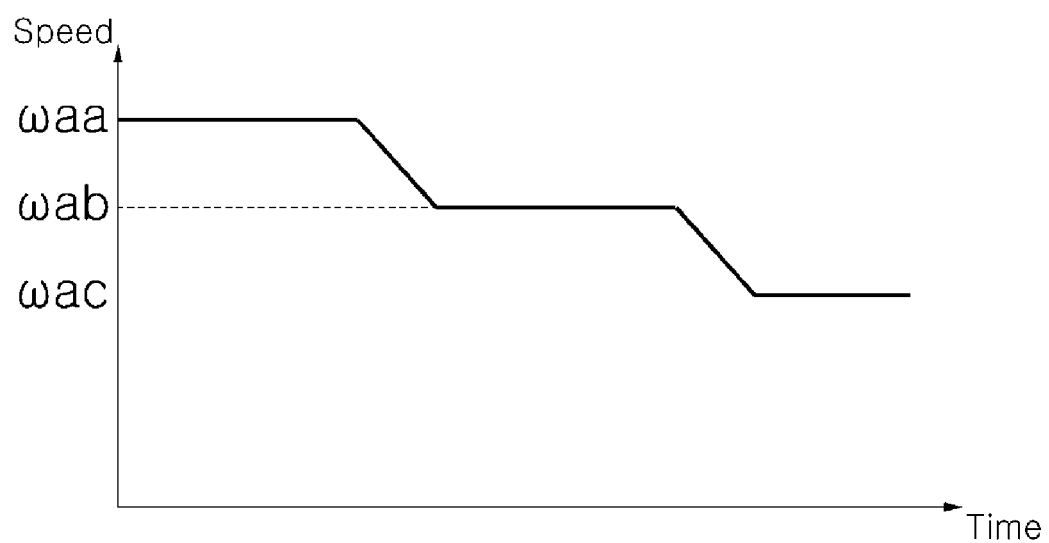

FIG. 13B illustrates decrease in the driving speed of the motor 630 from $\omega aa$ to $\omega ab$ to $\omega ac$ when the water level of the washing tub is sequentially lowered as shown in FIG. 13A.

The driving speed $\omega aa$ may correspond to hb1 which is the difference between the water level of the washing tub and the drain pipe 199*a* in FIG. 13A(a), $\omega ab$ may correspond to hb2 which is the difference between the water level of the washing tub and the drain pipe 199*a* in FIG. 13A(b), and $\omega ac$ may correspond to hb in FIG. 13A(c).

Figure 14A:
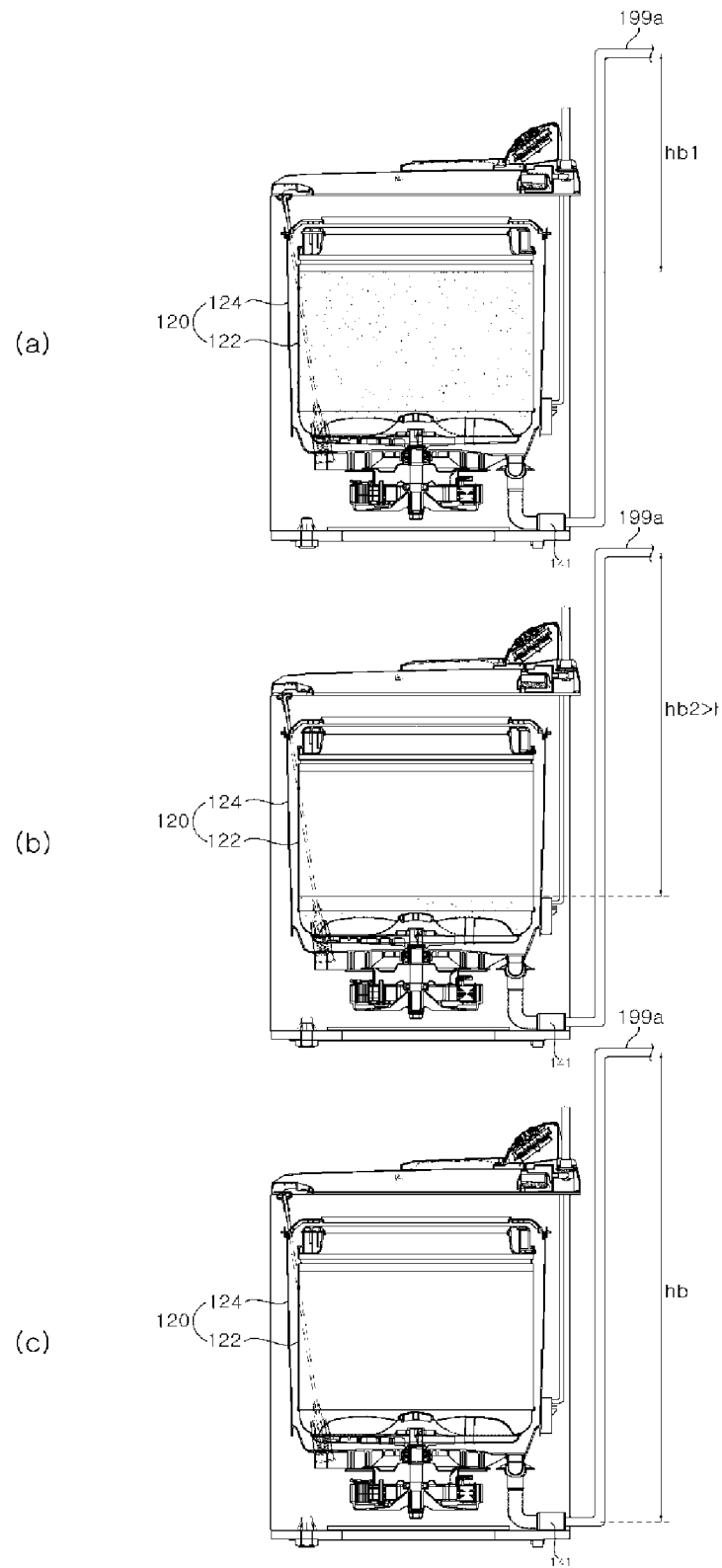

FIG. 14A illustrates sequential lowering of the water level in the washing tub 120.

In particular, FIG. 14A corresponds to FIG. 7A in terms of the position of the drain pipe 199*a*.

FIG. 14A(a) illustrates a case where the difference between the water level of the washing tub and the height of the drain pipe 199*a* is hb1, FIG. 14A(b) illustrates a case where the difference between the water level of the washing tub and the height of the drain pipe 199*a* is hb2, and FIG. 14A(c) illustrates a case where the water level of the washing tub is zero.

The inverter controller 430 of the drain pump driving apparatus or the controller 210 of the laundry treatment machine may control the rotational speed of the motor 630 to be varied based on the calculated lift such that the speed of the motor 630 decreases as the water level of the water introduction part is lowered, as described above.

Figure 14B:
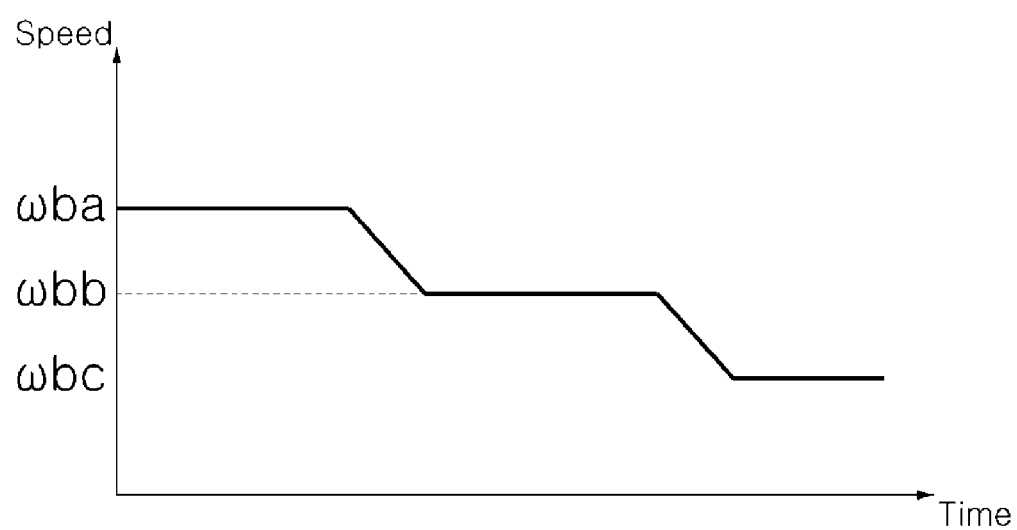

FIG. 14B illustrates decrease in the driving speed of the motor 630 from $\omega ba$ to $\omega bb$ to $\omega bc$ when the water level of the washing tub is sequentially lowered as shown in FIG. 14A.

The driving speed $\omega ba$ may correspond to ha1, which is the difference between the water level of the washing tub and the drain pipe 199*a* in FIG. 14A(a), $\omega bb$ may correspond to ha2, which is the difference between the water level of the washing tub and the drain pipe 199*a* in FIG. 14A(b), and $\omega bc$ may correspond to ha in FIG. 14A(c).

The value of ωba may be less than ωaa of FIG. 13B. That is, as the level of the lift is lowered, the speed of the motor 630 may decrease.

FIGS. 11 and 12 illustrate a lift calculation method based on the output current. Similarly, it is also possible to calculate the lift based on the power calculated in the power calculator of FIG. 6.

The inverter controller 430 of the drain pump driving apparatus or the controller 210 of the laundry treatment machine may calculate a lower level of the lift as the calculated power or load is lowered.

Figure 15:
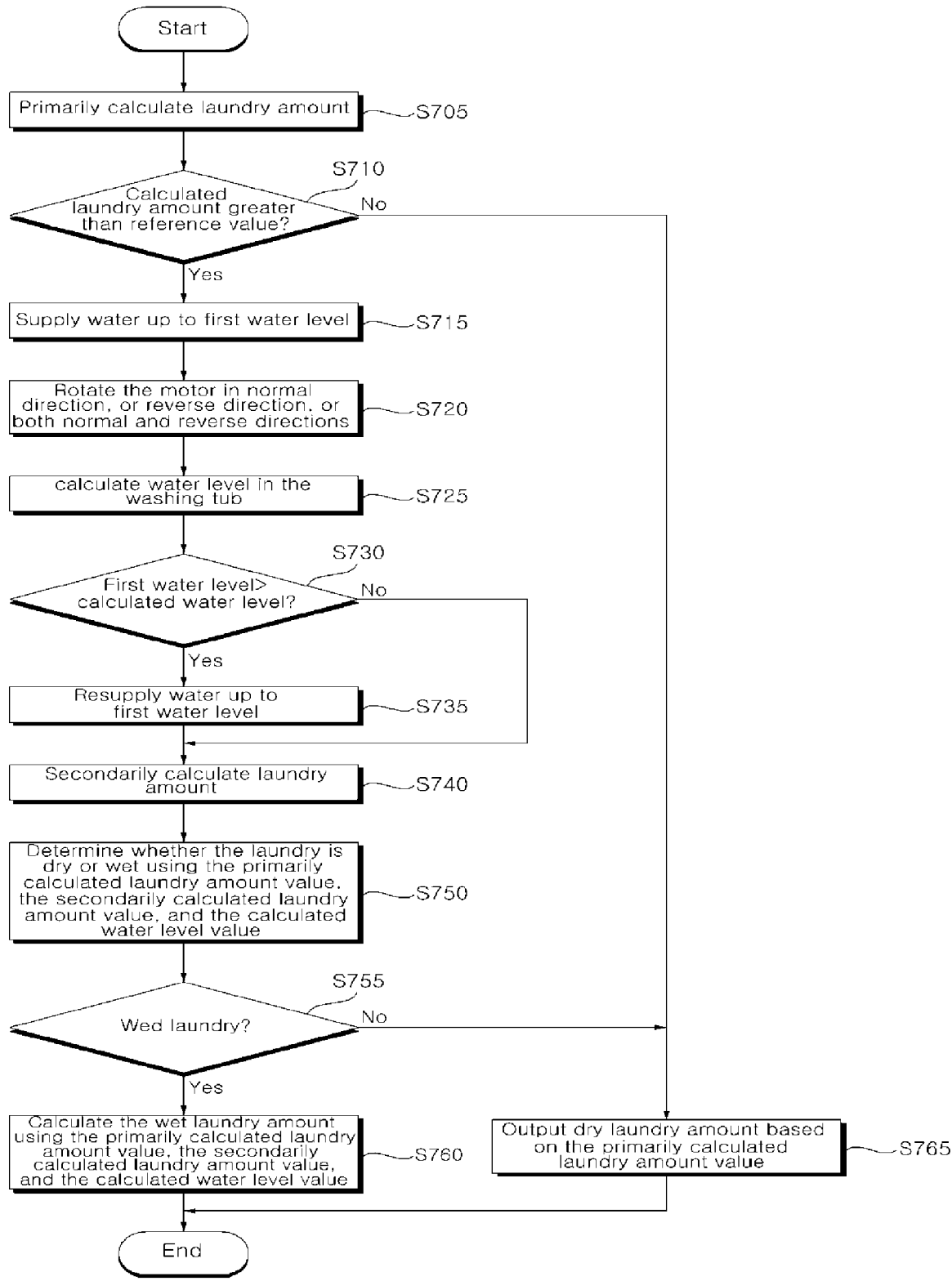
FIG. 15 is a flowchart illustrating an operation method for a laundry treatment machine according to an embodiment of the present invention.
Figure 17:
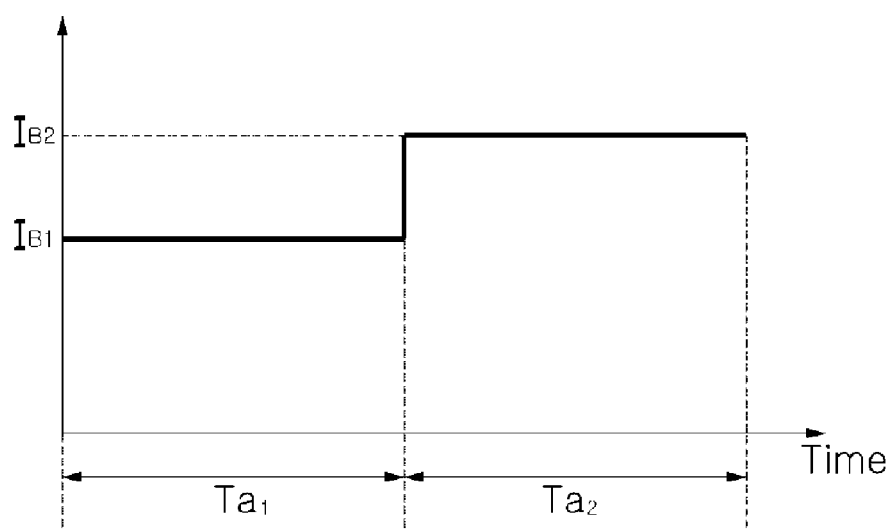
Figure 18A:
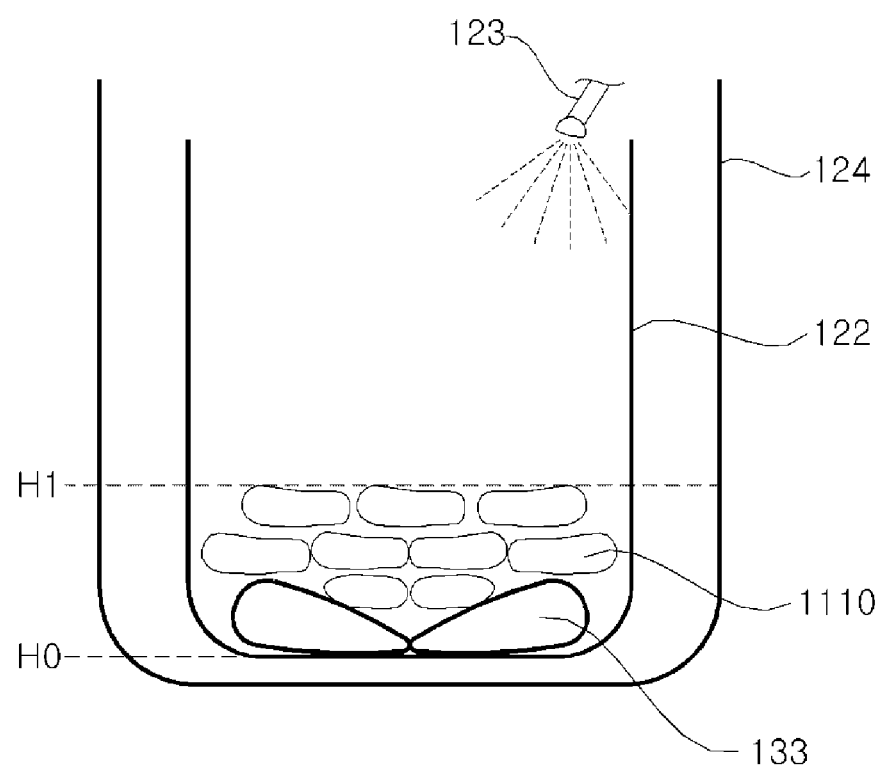
Figure 18B:
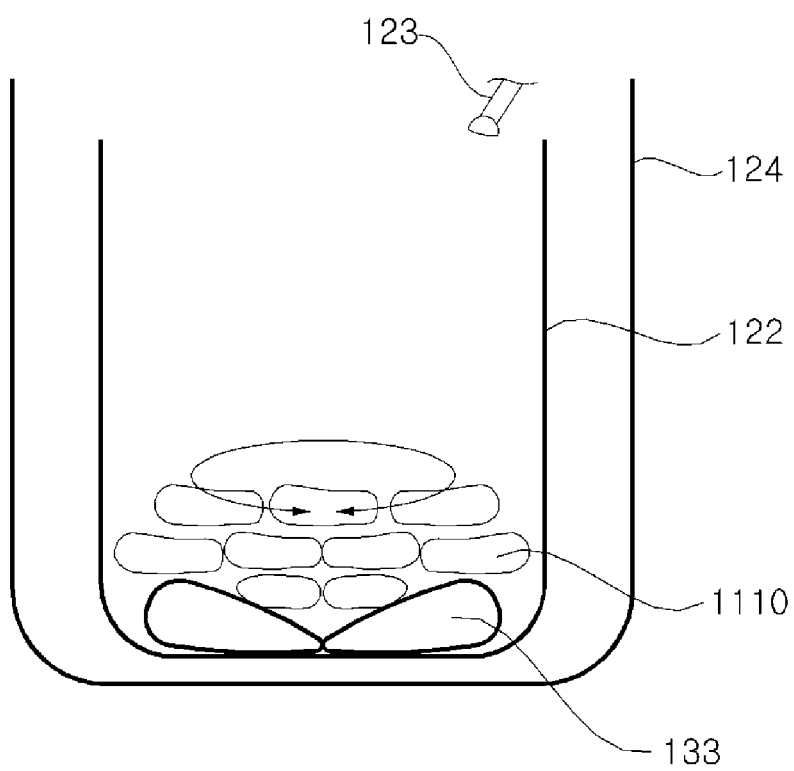
Figure 18C:
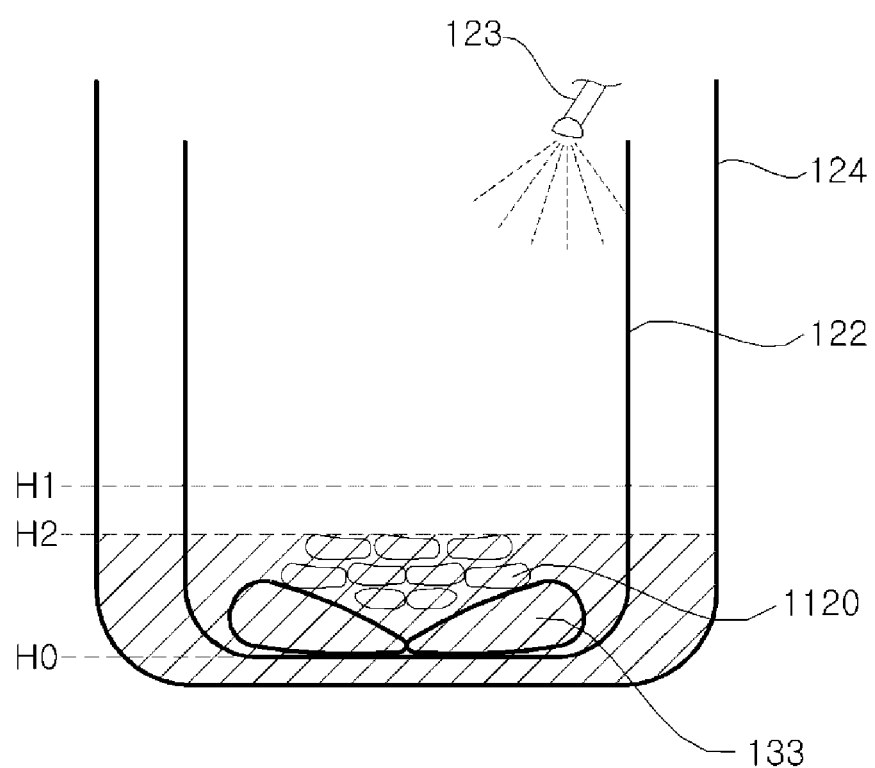

FIG. 15 is a flowchart illustrating an operation method for a laundry treatment machine according to an embodiment of the present invention, and FIGS. 17 to 18C illustrate the operation method of FIG. 15.

Referring to FIG. 15, the controller 210 of the laundry treatment machine primarily calculates the laundry amount in the washing tub (S1505).

Various methods may be used to calculate the laundry amount.

For example, as a method of sensing the laundry amount according to an embodiment of the present invention, the laundry amount in the washing tub may be calculated based on based on a current command value for driving the motor during an acceleration period and a current command value for driving the motor during a constant speed period. Further, the counter electromotive force generated from the motor during the constant speed period may be calculated, and the calculated counter electromotive force may be reflected in sensing the amount laundry. Thereby, calculating of the laundry amount may be more accurate.

As another example of sensing the laundry amount, rotation of the washing tub may be accelerated, and the laundry amount in the washing tub may be calculated based on a current command value for driving the motor for rotating the washing tub during the acceleration period or an output current flowing to the motor.

Next, the controller 210 determines whether the calculated laundry amount is greater than or equal to a reference value (S1510). If the calculated laundry amount is less than the reference value, the controller performs step S1565, determining that the laundry is dry. If the calculated laundry amount is greater than or equal to the reference value, the controller performs step S1515 and subsequent steps.

The controller 210 determines that the laundry is dry if the calculated laundry amount is less than the reference value. If the calculated laundry amount is greater than or equal to the reference value, the controller 210 performs step S1515 and subsequent steps in consideration of a possibility that the laundry is wet.

Next, the controller 210 controls water to be supplied to in the washing tub up to a first water level (S1515). Then, the controller 210 controls the motor for rotating the washing tub to rotate in the normal and reverse directions (S1520). Then, the controller 210 calculates the water level in the washing tub (S1525).

FIG. 18A illustrates supply of water into the outer tub 124 of the washing tub up to a first water level. To this end, the controller 210 may control the water supply valve 125 for regulating the water supply channel 123. That is, the controller 210 may control the water supply valve 125 so as to supply water up to the first water level.

Next, FIG. 18B illustrates that the motor for rotating the washing tub rotates in the normal and reverse directions. This operation is intended to completely soak the laundry in the water in the washing tub after the water is supplied. It is also possible to rotate the motor forward or backward for a predetermined time.

Next, FIG. 18C illustrates lowering of the water level with the laundry containing the supplied water on the basis of forward and reverse rotations of the motor of FIG. 18B.

Measurement of the water level may be performed through a water level sensor. For example, the water level frequency at the zero water level may be 28 KHz, H1 may be a water level frequency of 25.9 KHz, and H2 may be a water level frequency of about 26.5 KHz. The water level frequency, that is, the water level value may be inversely proportional to the water level in the washing tub.

In an embodiment of the present invention, the water level frequency may be used to determine dry laundry/wet laundry and to calculate the amount of wet laundry. For details, refer to step S1550.

Next, the controller 210 determines whether the first water level is higher than the calculated water level (S1530), and if so, controls water to be resupplied up to the first water level (S1535).

To this end, the controller 210 may control the water supply valve 125 for regulating the water supply channel 123. That is, the controller 210 may control the water supply valve 125 so as to resupply water up to the first water level.

Next, the controller 210 secondarily calculates the laundry amount in the washing tub (S1540). Next, the controller 210 determines whether the laundry is dry or wet using the primarily calculated laundry amount, the secondarily calculated laundry amount, and the calculated water level value (S1550).

As described in step S1505, the secondary sensing of the laundry amount may be performed using various methods.

The controller 210 determines that the laundry is wet as the primarily calculated laundry amount increases or the calculated water level value decreases.

That is, the controller 210 determines that the laundry is wet as the primarily calculated laundry amount decreases or the calculated water level value increases.

Alternatively, as the difference between the calculated water level value and the first water level value increases, the controller 210 determines that the laundry is wet.

In the case of wet laundry, step S1550 is performed. In the case of dry laundry, step S1565 is performed.

That is, in the case of wet laundry, the controller 210 calculates the wet laundry amount based on the primarily calculated laundry amount value, the secondarily calculated laundry amount value, and the calculated water level value (S1550). Here, the wet laundry amount refers to an original laundry amount that does not contain moisture.

Calculation of the wet laundry amount may be performed by subtracting the amount of water from the amount of the water and laundry. That is, this operation may mean calculating the original laundry amount.

Increase in the difference between the secondarily calculated laundry amount value and the primarily calculated laundry amount value means wet laundry having a smaller amount of water. Decrease in the difference between the secondarily calculated laundry amount value and the primarily calculated laundry amount value means wet laundry having a larger amount of water.

Meanwhile, increase in the water level frequency of the calculated water level means wet laundry having a larger amount of water, and decrease in the water level frequency of the calculated water level means wet laundry having a smaller amount of water.

Accordingly, as the difference between the secondarily calculated laundry amount value and the primarily calculated laundry amount value increases, or the water level frequency of the calculated water level decreases, the wet laundry amount may increase. Alternatively, as the difference between the calculated water level value and the first water level value decreases, the wet laundry amount may increase.

That is, the wet laundry amount may decrease as the difference between the secondarily calculated laundry amount value and the primarily calculated laundry amount value decreases, or the water level frequency of the calculated water level increases. Alternatively, the wet laundry amount may decrease as the difference between the calculated water level value and the first water level value increases.

As described above, according to an embodiment of the present invention, laundry can be treated in accordance with its own weight by sensing the original laundry amount that does not contain moisture. Thereby, the washing time may be shortened, and the amount of water used may be reduced. As a result, the energy consumed in the laundry treatment machine may be reduced.

In the case of dry laundry, the controller 210 calculates the dry laundry amount based on the primarily calculated laundry amount value (S1565).

Based on the primarily calculated laundry amount value, the controller 210 may determine that the dry laundry amount increases as the primarily calculated laundry amount value increases.

It is possible to output the dry laundry amount through the table 1200 in FIG. 12. A current command value between the acceleration period and the constant speed period may be divided into a plurality of periods Se1, ..., Se10 and the dry laundry amount may be output based on each corresponding current command value, that is, a calculated value. That is, any one of L1 to L10 may be output as the dry laundry amount.

In order to calculate the laundry amount in the laundry treatment machine, the driving unit 220 first aligns the motor 230 that rotates the washing tub 120. That is, the driving unit 220 controls the motor 230 so as to fix the rotor of the motor 230 at a predetermined position. That is, a predetermined current is applied to the motor 230.

Such a motor alignment period may correspond to the period Ta in FIG. 15.

For example, it is possible to apply a current having a predetermined magnitude to the motor 230 during the motor alignment period Ta. Thereby, the rotor of the motor 230 is moved to a predetermined position.

As another example, it is also possible to apply currents of different magnitudes during the motor alignment period Ta. This operation is intended to calculate a motor constant which may be used in calculating the counter electromotive force in a constant-speed rotation period Tc, which will be described later. Here, the motor constant may mean, for example, the equivalent resistance value Rs of the motor 230 or the like.

Figure 16:
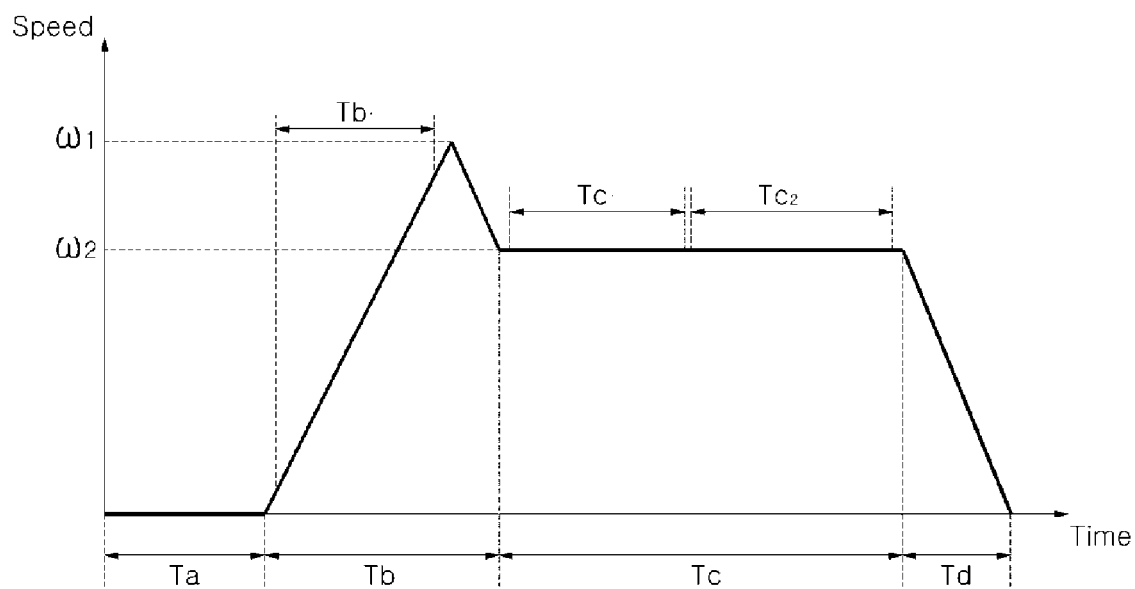
FIGS. 16 to 18C illustrate the operation method of FIG. 15.

FIG. 16 illustrates that, in the motor alignment period Ta, a current $I_{B1}$ of a first magnitude flows to the motor 230 during a first period Ta1 and a current $I_{B2}$ of a second magnitude flows to the motor 230 during the second period Ta2.

Here, the length of the first period Ta1 may be equal to that of the second period Ta2, and the second magnitude of the current $I_{B2}$ may be twice the first magnitude of the current $I_{B1}$.

Next, the driving unit 220 accelerates rotation of the motor 230 for rotating the washing tub 120. Specifically, the driving unit 220 may accelerate rotation of the motor 230 from the stationary state to a first speed $\omega 1$. To accelerate the rotation, the current command value applied to the motor 230 may be sequentially increased.

The first speed $\omega 1$ is a speed at which the resonance band of the washing tub 120 can be avoided, and may be between about 40 rpm and 50 rpm.

Such a motor accelerating rotation period may correspond to period Tb in FIG. 15.

Then, the driving unit 220 rotates the motor 230, which serves to rotate the washing tub 120, at a constant speed. Specifically, after rotation of the motor 230 reaches the first speed $\omega 1$ through acceleration, the driving unit 220 may rotate the motor 230 at a constant speed, which is a second speed $\omega 2$. For constant-speed rotation, the current command value applied to the motor 230 may be constant.

The second speed $\omega 2$ may be lower than the first speed $\omega 1$ and may be between about 25 rpm and about 35 rpm.

Such a motor constant-speed rotation period may correspond to period Tc in FIG. 15.

The controller 210 may perform laundry amount sensing based on the difference between the average value of the current command values for rotating the motor 230 during the acceleration period and the average value of the current command values for rotating the motor 230 during the constant-speed period. Thereby, the laundry amount may be efficiently calculated.

The current command value for rotating the motor 230 in the acceleration period means a current command value in which the inertia component and the frictional force component are combined and the current command value for rotating the motor 230 in the constant-speed period may mean a current command value corresponding to the frictional force component without the inertia component corresponding to the acceleration.

The laundry amount sensing described in FIGS. 15 to 18C may be performed in each of the washing, rinsing, and dewatering processes.

Then, after the laundry amount is calculated, the introduced water may be drained. At this time, the drain pump driving apparatus 620 described in FIGS. 1 to 14 may operate.

That is, the inverter controller 430 of the drain pump driving apparatus 620 or the controller 210 of the laundry treatment machine may calculate the speed ripple of the motor based on the output current Idc, and perform a control operation based on the calculated motor speed ripple to change the speed of the motor. Thereby, noise caused by residual water remaining in the drain pipe may be reduced.

Meanwhile, the inverter controller 430 of the drain pump driving apparatus 620 or the controller 210 of the laundry treatment machine may calculate the speed of the motor based on the output current, and calculate a lift, which is a difference between the water level of a water introduction part through which water flows into the drain pump and the water level of a water discharge part for discharging water from the drain pump based on the calculated motor speed. Accordingly, the lift may be accurately calculated without using a water pressure sensor and a water level sensor. Therefore, manufacturing costs may be reduced.

While FIG. 1 illustrates a top loading type machine as a laundry treatment machine, the drain pump driving apparatus 620 according to an embodiment of the present invention may also be applied to a front-loading washing machine, that is, a drum type washing machine.

The drain pump driving apparatus and the laundry treatment machine having the same according to embodiments of the present invention are not limited to the configuration and method of the embodiments described above. Variations may be made to the embodiments described above by selectively combining all or some of the embodiments.

A method for operating the drain pump driving apparatus and the laundry treatment machine of the present invention is implementable by code readable a processor provided to each of the drain pump driving apparatus, on a recording medium readable by the processor. The recording medium readable by the processor includes all kinds of recording devices for storing data which can be read by the processor.

As is apparent from the above description, the present invention has the following effects.

A drain pump driving apparatus and a laundry treatment machine including the same according to embodiments of the present invention include a motor to operate the drain pump and an inverter for converting DC power into AC power through a switching operation and outputting the converted AC power to the motor, an output current detector to detect an output current flowing to the motor, and a controller to control the inverter. The controller may calculate speed ripple of the motor based on the output current, and vary the speed of the motor based on the calculated speed ripple of the motor. As a result, noise produced during drainage may be reduced.

Particularly, as the calculated speed ripple of the motor becomes larger, the speed of the motor is controlled so as to be reduced gradually or stepwise. Thereby, noise produced during drainage may be reduced.

The controller may calculate the speed of the motor based on the output current, and calculate a lift, which is a difference between the water level of a water introduction part through which water flows into the drain pump and the water level of a water discharge part for discharging water from the drain pump based on the calculated motor speed. Accordingly, the lift may be accurately calculated without using a water pressure sensor and a water level sensor. Therefore, manufacturing costs may be reduced.

In addition, by controlling the rotational speed of the motor to be varied based on the calculated lift, drainage may be performed smoothly, and power consumption may be reduced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A drain pump driving apparatus comprising:
   a motor to drive a drain pump;
   an inverter to convert, based on a switching operation, a direct current (DC) power to an alternating current (AC) power, and the inverter to provide the converted AC power to the motor;
   an output current detector to detect an output current flowing to the motor; and
   a controller to control the inverter,
   wherein the drain pump is connected to a drain pipe, and a height of the drain pipe is greater than a height of the drain pump and a height of a bottom surface of a washing tub,
   wherein when dewatering process is performed without washing process and rinsing process, the controller is configured to rotate the motor at a first speed, and to change a speed of the motor based on motor speed ripple generated by movement of residual water remaining in the drain pipe during the rotating of the motor at the first speed.

2. The drain pump driving apparatus according to claim 1, wherein the controller is configured to control the speed of the motor to decrease sequentially or to decrease stepwise as the motor speed ripple increases.

3. The drain pump driving apparatus according to claim 1, wherein the controller is configured to calculate a lift based on the output current, wherein the lift corresponds to a difference between a water level of a water introduction part flowing into the drain pump and a water level of a water discharge part discharged from the drain pump.

4. The drain pump driving apparatus according to claim 3, wherein the controller is configured to change a rotational speed of the motor based on the calculated lift.

5. The drain pump driving apparatus according to claim 3, wherein the controller is configured to rotate the motor at a first speed,
   wherein, when the speed of the motor, determined based on the output current, is a second speed during the rotation of the motor at the first speed, the controller is configured to determine the lift as a first level based on the second speed.

6. The drain pump driving apparatus according to claim 5, wherein the controller is configured to rotate the motor at the first speed,
   wherein, when the speed of the motor, determined based on the output current, is a third speed during the rotation of the motor at the first speed, the controller is configured to determine the lift as a second level, the second level to be higher than the first level, and the third speed is to be less than the second speed.

7. The drain pump driving apparatus according to claim 3, wherein the controller is configured to determine a lower level of the lift while the calculated speed of the motor is to be lowered.

8. The drain pump driving apparatus according to claim 3, wherein the controller is configured to change a rotational speed of the motor based on the calculated lift such that the speed of the motor is to decrease while the water level of the water introduction part is to be lowered.

9. The drain pump driving apparatus according to claim 1, wherein the motor includes a brushless DC motor.

10. The drain pump driving apparatus according to claim 1, further comprising:
a DC link capacitor to store the DC power,
wherein the output current detector is disposed between the DC link capacitor and the inverter.

11. The drain pump driving apparatus according to claim 1, wherein the controller includes:
a power calculator to determine a power or a load of the motor based on the output current;
a speed command generator to provide a speed command value based on the determined power;
a current command generator to provide a current command value based on the speed command value and the determined speed of the motor;
a voltage command generator to provide a voltage command value based on the current command value and the output current; and
a switching control signal output device to provide a switching control signal based on the voltage command value, the switching control signal for controlling driving of the inverter.

12. The drain pump driving apparatus according to claim 11, wherein the controller includes:
a speed calculator to determine the speed of the motor based on the output current.

13. A laundry treatment machine comprising:
a washing tub;
a driving device to drive the washing tub;
a drain pump; and
a drain pump driving apparatus to drive the drain pump, wherein the drain pump driving apparatus includes:
a motor to drive the drain pump;
an inverter to convert a direct current (DC) power to an alternating current (AC) power by a switching operation, and the inverter to provide the converted AC power to the motor;
an output current detector to detect an output current flowing to the motor; and
a controller to control the inverter,
wherein the drain pump is connected to a drain pipe, and a height of the drain pipe is greater than a height of the drain pump and a height of a bottom surface of the washing tub,
wherein when dewatering process is performed without washing process and rinsing process, the controller is configured to rotate the motor at a first speed, and to change a speed of the motor based on motor speed ripple generated by movement of residual water remaining in the drain pipe during the rotating of the motor at the first speed.

14. The laundry treatment machine according to claim 13, wherein the controller is configured to control the speed of the motor to decrease sequentially or to decrease stepwise as the motor speed ripple increases.

15. The laundry treatment machine according to claim 13, wherein the controller is configured to calculate a lift based on the output current, wherein the lift corresponds to a difference between a water level of a water introduction part flowing into the drain pump and a water level of a water discharge part discharged from the drain pump.

16. The laundry treatment machine according to claim 15, wherein the controller is configured to change a rotational speed of the motor based on the calculated lift.

17. The laundry treatment machine according to claim 15, wherein the controller is configured to rotate the motor at a first speed,
wherein, when the speed of the motor, determined based on the output current, is a second speed during the rotation of the motor at the first speed, the controller is configured to calculate the lift as a first level based on the second speed.

18. The laundry treatment machine according to claim 17, wherein the controller is configured to change a rotational speed of the motor based on the calculated lift such that the speed of the motor is to decrease while the water level of the water introduction part is to be lowered.

* * * * *